(12) United States Patent
Rosko et al.

(10) Patent No.: US 12,465,931 B2
(45) Date of Patent: Nov. 11, 2025

(54) EXPOSED SECONDARY SHOWERHEAD SYSTEM

(71) Applicant: Delta Faucet Company, Indianapolis, IN (US)

(72) Inventors: Michael Scot Rosko, Greenwood, IN (US); Kyle Robert Davidson, Noblesville, IN (US); Joshua Drew Wales, Indianapolis, IN (US); Garry Robin Marty, Fishers, IN (US); David Lee, Westfield, IN (US); Bocomo Fu, Guangzhou (CN)

(73) Assignee: Delta Faucet Company, Indianapolis, IN (US)

( * ) Notice: Subject to any disclaimer, the term of this patent is extended or adjusted under 35 U.S.C. 154(b) by 0 days.

(21) Appl. No.: 18/614,031

(22) Filed: Mar. 22, 2024

(65) Prior Publication Data
US 2024/0226923 A1 Jul. 11, 2024

Related U.S. Application Data

(62) Division of application No. 16/934,067, filed on Jul. 21, 2020, now Pat. No. 11,951,493.

(60) Provisional application No. 62/876,756, filed on Jul. 21, 2019.

(51) Int. Cl.
| | |
|---|---|
| *B05B 1/16* | (2006.01) |
| *A47K 3/28* | (2006.01) |
| *B05B 1/18* | (2006.01) |
| *E03C 1/04* | (2006.01) |

(52) U.S. Cl.
CPC .............. *B05B 1/1681* (2013.01); *A47K 3/28* (2013.01); *B05B 1/185* (2013.01); *E03C 1/0405* (2013.01); *E03C 2201/30* (2013.01)

(58) Field of Classification Search
CPC ..... B05B 1/1681; B05B 1/185; B05B 1/1636; B05B 1/169; B05B 1/18; B05B 15/62; B05B 15/65; A47K 3/28; E03C 1/0405; E03C 2201/30; E03C 1/0408
USPC .......................... 4/596, 567, 615, 670, 605
See application file for complete search history.

(56) References Cited

U.S. PATENT DOCUMENTS

| | | | |
|---|---|---|---|
| 2,949,109 | A | 8/1960 | Koolnis |
| 3,375,532 | A | 4/1968 | Gellmann |
| 3,737,107 | A | 6/1973 | Wright |
| 3,806,963 | A | 4/1974 | Flynn |

(Continued)

FOREIGN PATENT DOCUMENTS

| | | |
|---|---|---|
| AU | 3928302 | 6/2002 |
| CA | 2140611 | 7/1996 |

(Continued)

OTHER PUBLICATIONS

Hydroluxe 1433 Handheld Showerhead & Rain Shower Combo. High Pressure 24 Function 4" Face Dual 2 in 1 Shower Head System with Stainless Steel Hose, Patented 3-way Water Diverter in All-Chrome Finish, retrieved on Oct. 7, 2019 from https://www.amazon.com/Hydroluxe-1433-Showerhead-Stainless_All-Chrome/dp/B00JUZTG4M?ref_=fsclp_pl_dp_4.

*Primary Examiner* — Lori L Baker
(74) *Attorney, Agent, or Firm* — Bose McKinney & Evans LLP

(57) ABSTRACT

An exposed secondary showerhead system configured to be supported by a shower enclosure. The illustrative showerhead system includes an overhead conduit fluidly coupled to a shower inlet pipe and to at least one showerhead.

15 Claims, 32 Drawing Sheets

(56) References Cited

U.S. PATENT DOCUMENTS

| | | | |
|---|---|---|---|
| 3,822,826 | A | 7/1974 | Wilson |
| 3,858,252 | A | 1/1975 | Ejchorszt |
| 3,913,839 | A | 10/1975 | Wilson |
| 3,971,074 | A | 7/1976 | Yxfeldt |
| 3,984,879 | A | 10/1976 | Ejchorszt |
| 4,360,159 | A | 11/1982 | Haynes |
| 4,545,083 | A | 10/1985 | Searson |
| 4,554,690 | A | 11/1985 | Knapp et al. |
| 4,752,975 | A | 6/1988 | Yates |
| 4,809,369 | A | 3/1989 | Bowden |
| 4,901,927 | A | 2/1990 | Valdivia |
| 5,073,996 | A | 12/1991 | Schinle |
| 5,148,556 | A | 9/1992 | Bottoms, Jr. et al. |
| D333,338 | S | 2/1993 | Klose |
| D334,794 | S | 4/1993 | Klose |
| D337,369 | S | 7/1993 | Klose |
| D339,492 | S | 9/1993 | Klose |
| D340,376 | S | 10/1993 | Klose |
| D341,191 | S | 11/1993 | Klose |
| 5,564,139 | A | 10/1996 | Shorr |
| 5,678,258 | A | 10/1997 | Healy |
| 5,692,252 | A | 12/1997 | Zwezdaryk |
| 5,742,961 | A | 4/1998 | Casperson et al. |
| 5,788,160 | A * | 8/1998 | Woog .................. E03C 1/06 239/553.3 |
| 5,799,346 | A | 9/1998 | Tiernan |
| 5,870,781 | A | 2/1999 | Williams |
| 6,227,456 | B1 * | 5/2001 | Colman ................ E03C 1/06 239/536 |
| 6,243,891 | B1 * | 6/2001 | Nickerson ............. F16K 31/002 4/597 |
| 6,256,808 | B1 * | 7/2001 | Graham ................. A47K 3/28 4/615 |
| 6,276,003 | B1 | 8/2001 | Knapp |
| 6,378,791 | B1 | 4/2002 | Perry et al. |
| 6,415,461 | B1 | 7/2002 | Singer |
| 6,567,998 | B2 | 5/2003 | D'Ugo |
| 6,829,790 | B2 | 12/2004 | Petrovic et al. |
| 7,043,776 | B1 * | 5/2006 | Wu ...................... E03C 1/0408 4/601 |
| 7,356,857 | B2 * | 4/2008 | Rosenberg ............ E03C 1/0408 239/536 |
| 7,657,949 | B2 | 2/2010 | Zhadanov et al. |
| 7,900,295 | B2 * | 3/2011 | Lev ....................... B05B 15/62 4/615 |
| 8,082,610 | B2 * | 12/2011 | Henry ................... E03C 1/023 4/615 |
| 8,230,882 | B2 | 7/2012 | Lacher |
| 8,429,769 | B2 | 4/2013 | Gross |
| 8,683,624 | B1 * | 4/2014 | Zhadanov ............. E03C 1/025 4/615 |
| 9,068,325 | B2 | 6/2015 | Neagoe |
| 9,095,861 | B2 | 8/2015 | Costello |
| 9,242,259 | B2 | 1/2016 | Jeronimus |
| 9,273,452 | B2 | 3/2016 | Wilson |
| RE47,861 | E * | 2/2020 | Lev ........................ B05B 1/185 |
| 10,967,390 | B2 * | 4/2021 | Lord ...................... E03B 1/048 |
| 12,220,715 | B2 * | 2/2025 | Davies .................. B05B 15/652 |
| 2002/0074430 | A1 | 6/2002 | Gransow et al. |
| 2002/0083518 | A1 | 7/2002 | D'Ugo |
| 2005/0127211 | A1 | 6/2005 | Yeiser |
| 2005/0251905 | A1 | 11/2005 | Schoenherr |
| 2006/0218720 | A1 | 10/2006 | Thompson |
| 2007/0033729 | A1 | 2/2007 | Faux |
| 2007/0158460 | A1 * | 7/2007 | Lev ....................... E03C 1/0409 239/443 |
| 2007/0209108 | A1 | 9/2007 | Shorr et al. |
| 2009/0044329 | A1 | 2/2009 | Kestian et al. |
| 2009/0094737 | A1 | 4/2009 | Tracey |
| 2009/0293190 | A1 * | 12/2009 | Ringelstetter .......... E03C 1/057 4/605 |
| 2010/0037389 | A1 | 2/2010 | Gross |
| 2011/0010840 | A1 | 1/2011 | Paul |
| 2012/0102637 | A1 | 5/2012 | Collinsworth |
| 2012/0255114 | A1 * | 10/2012 | Reeves ................. E03C 1/0408 4/596 |
| 2014/0197250 | A1 | 7/2014 | Jeronimus |
| 2014/0250586 | A1 * | 9/2014 | Zhadanov ............. E03C 1/06 4/615 |
| 2015/0048181 | A1 | 2/2015 | Costello |
| 2015/0082535 | A1 | 3/2015 | Parks et al. |
| 2016/0074884 | A1 | 3/2016 | Short |
| 2017/0157634 | A1 | 6/2017 | Johnson |
| 2017/0165686 | A1 | 6/2017 | Lin et al. |
| 2019/0022671 | A1 * | 1/2019 | Jack ..................... B05B 1/18 |
| 2020/0263399 | A1 | 8/2020 | Sierks et al. |
| 2020/0384486 | A1 | 12/2020 | Ball |
| 2021/0008584 | A1 | 1/2021 | Zhu et al. |
| 2021/0039118 | A1 * | 2/2021 | Lee ....................... E03C 1/0408 |
| 2021/0220846 | A1 * | 7/2021 | Lord ..................... B05B 1/18 |
| 2022/0371031 | A1 | 11/2022 | Ball |
| 2023/0105648 | A1 * | 4/2023 | Rexach ................. E03C 1/08 239/556 |
| 2023/0271200 | A1 | 8/2023 | Lee et al. |
| 2023/0372952 | A1 * | 11/2023 | Lev ....................... B05B 1/1636 |
| 2024/0009688 | A1 * | 1/2024 | Clarke .................. E03C 1/0409 |
| 2024/0167255 | A1 * | 5/2024 | Greenizer ............. E03C 1/0408 |
| 2024/0167256 | A1 * | 5/2024 | DePasquale .......... F16K 19/006 |
| 2024/0328129 | A1 * | 10/2024 | Beattie ................ F16K 11/0445 |

FOREIGN PATENT DOCUMENTS

| | | | |
|---|---|---|---|
| CA | 3028193 | | 7/2019 |
| CN | 110237958 | | 9/2019 |
| CN | 118338972 A | * | 7/2024 ............... A47K 3/28 |
| GB | 2325155 A | * | 11/1998 ............... A47K 3/28 |
| WO | WO 2002/042567 | | 5/2002 |
| WO | WO 2009023391 | | 2/2009 |

* cited by examiner

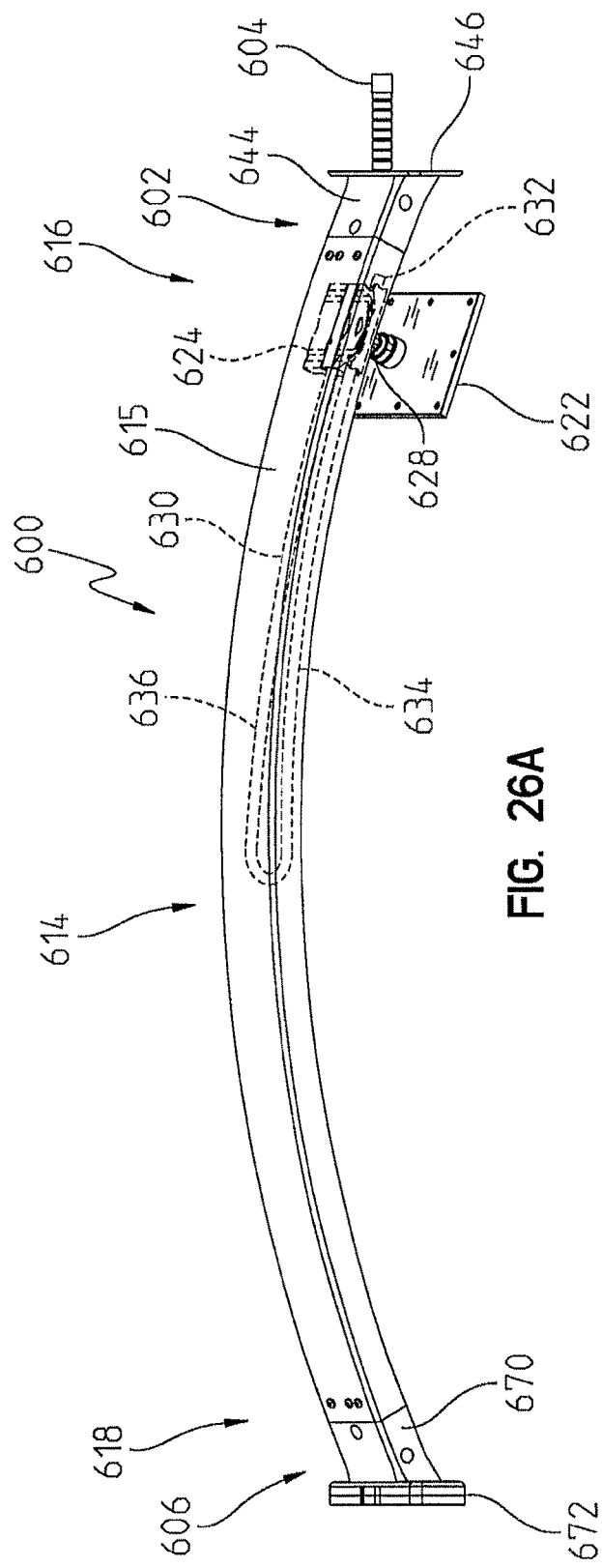
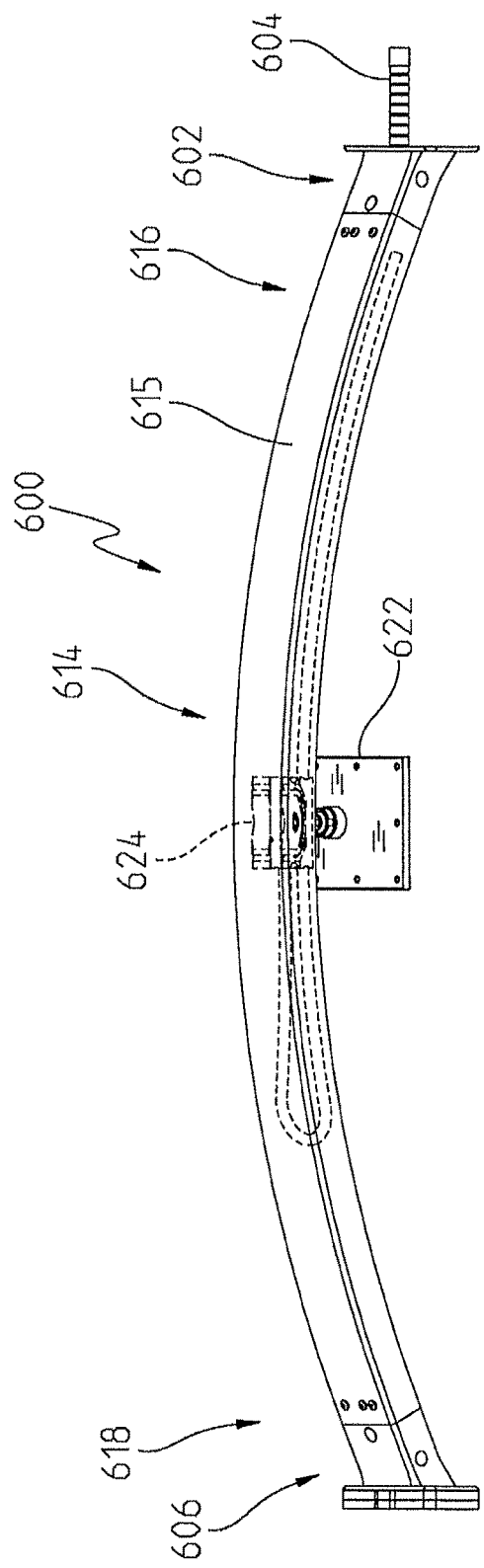
FIG. 26A
FIG. 26B

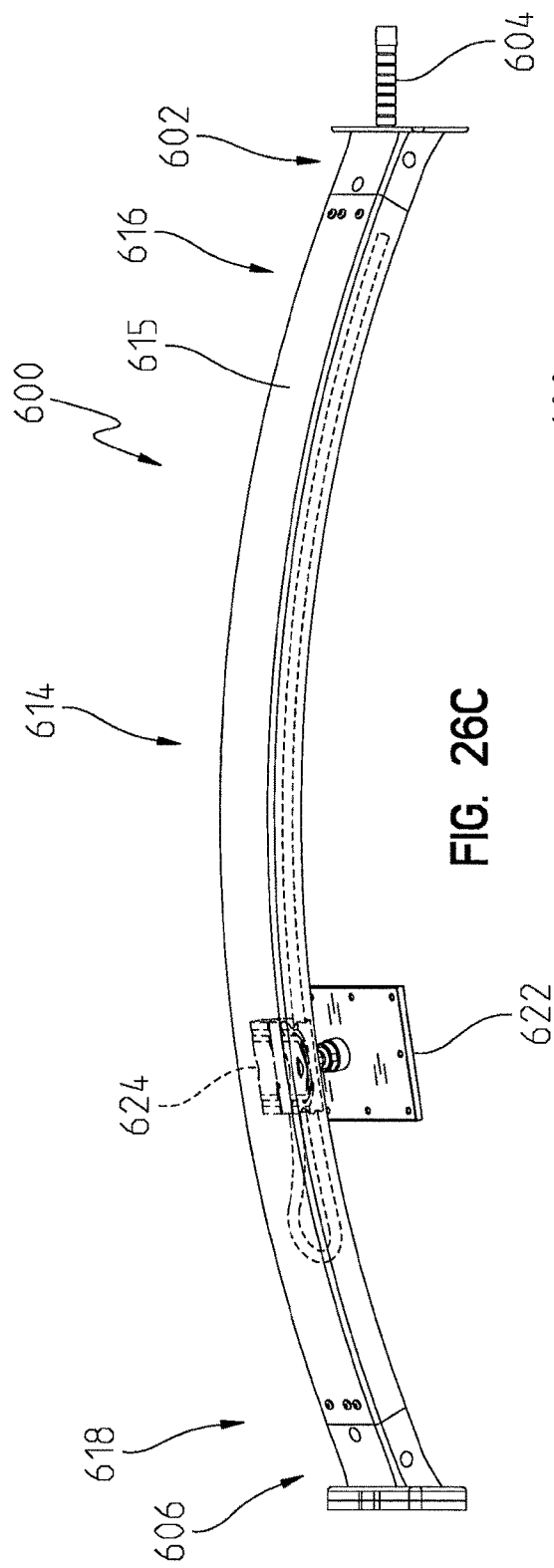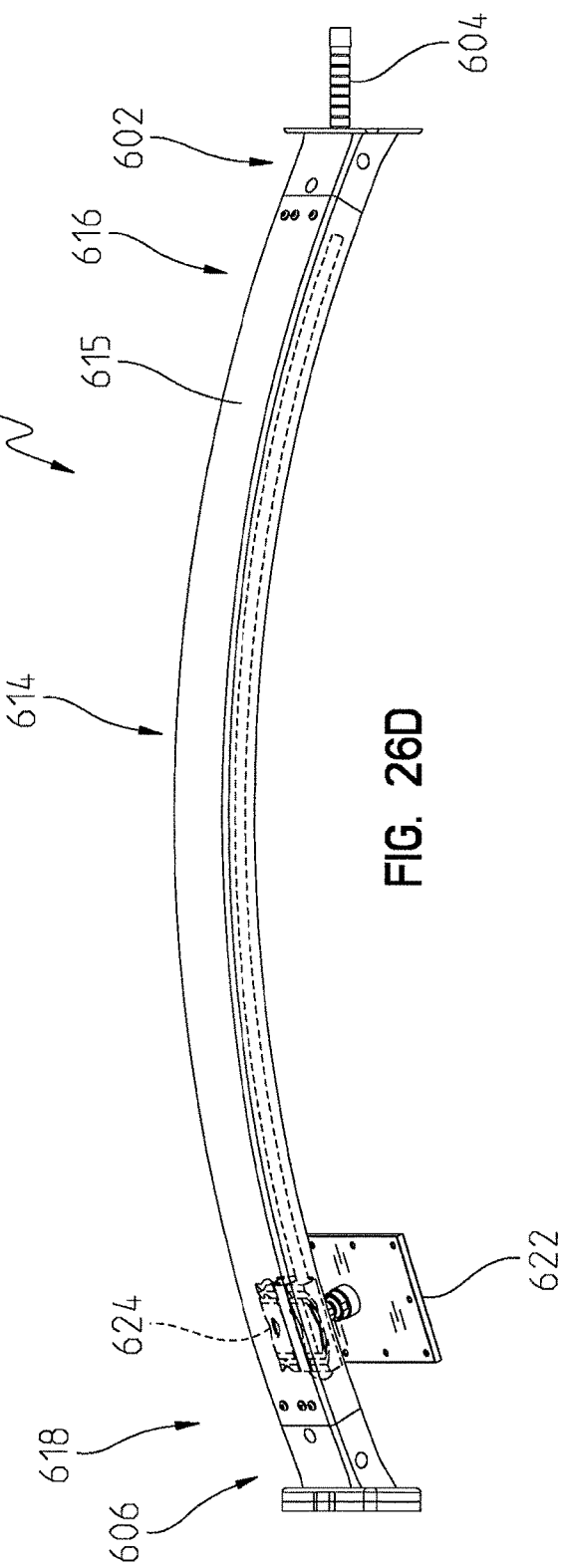

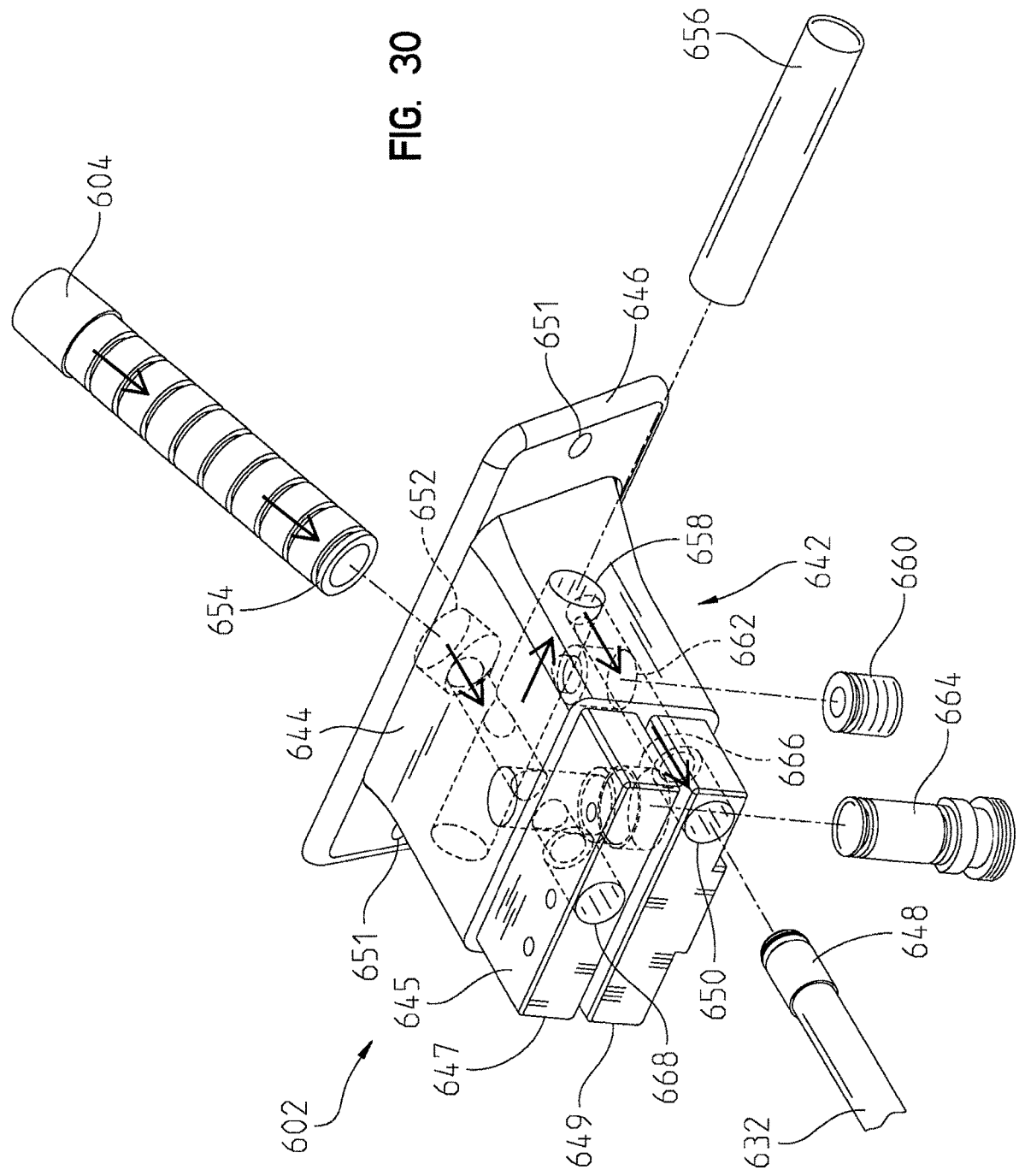

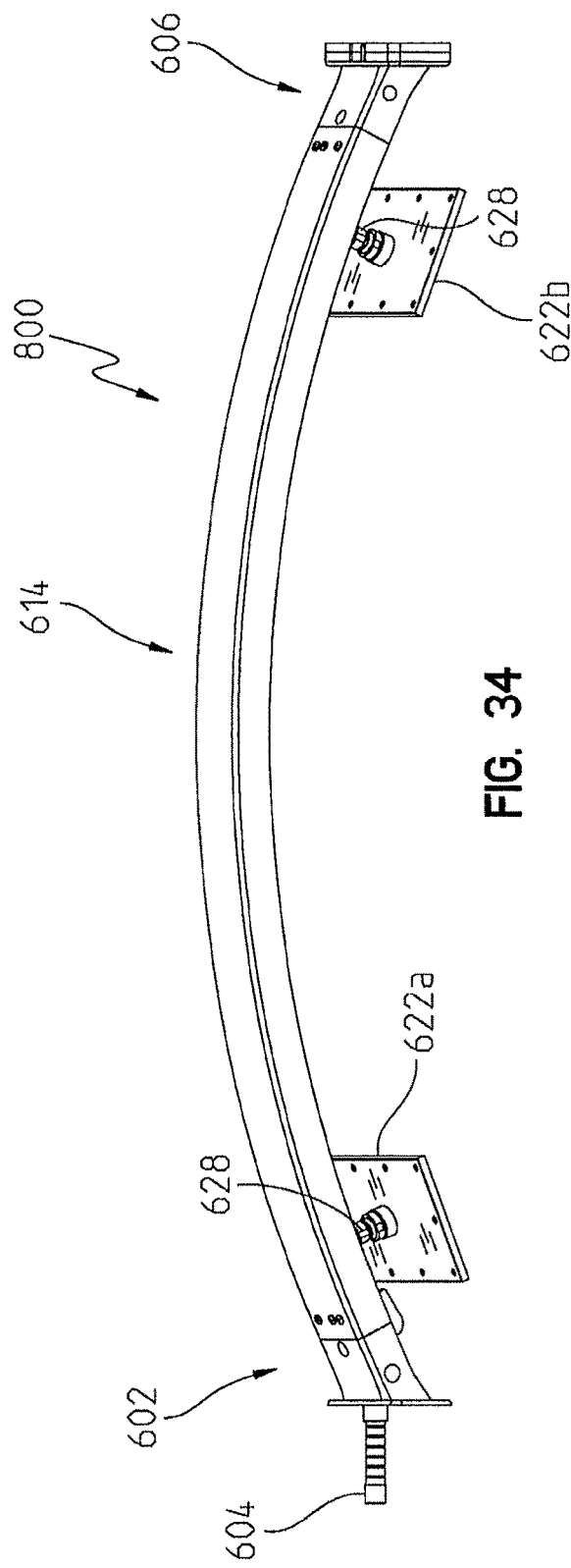
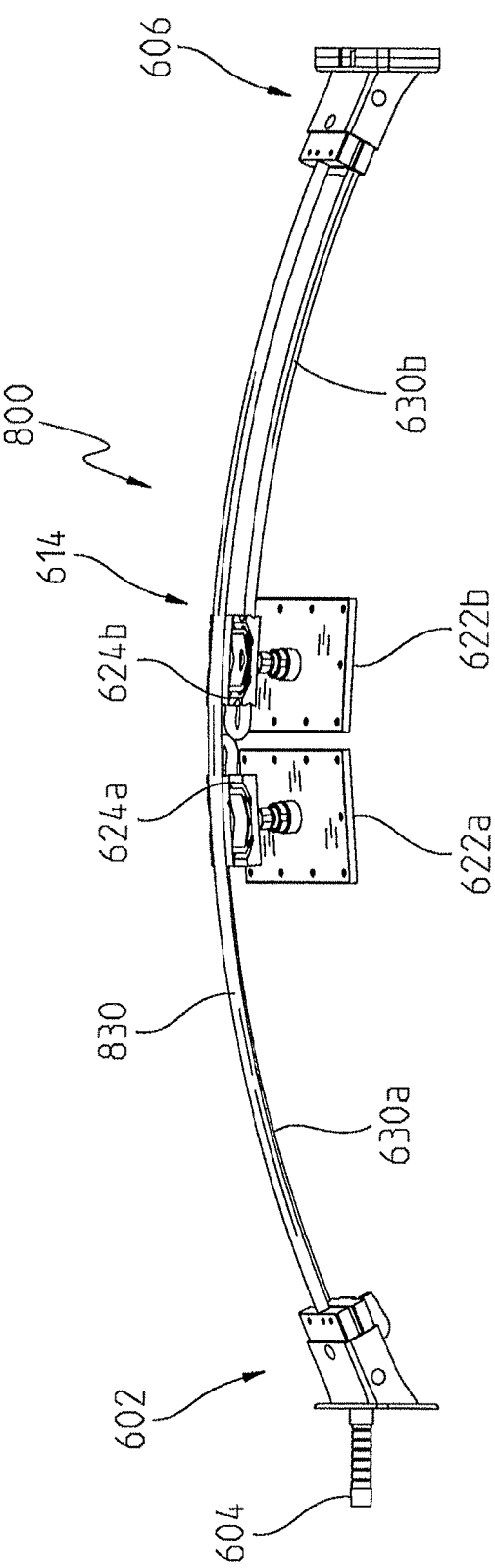

EXPOSED SECONDARY SHOWERHEAD SYSTEM

CROSS-REFERENCE TO RELATED APPLICATION

The present application is a divisional of U.S. patent application Ser. No. 16/934,067, filed Jul. 21, 2020, which claims priority to U.S. Provisional Patent Application Ser. No. 62/876,756, filed Jul. 21, 2019, the disclosures of which are expressly incorporated herein by reference.

BACKGROUND AND SUMMARY OF THE DISCLOSURE

The present disclosure relates generally to a shower system and, more particularly, to a secondary showerhead system that may be installed without requiring additional behind the wall plumbing. In the context of the present disclosure, a secondary showerhead system indicates that it is intended to replace or supplement a convention or primary wall mounted showerhead.

Standard showerhead systems typically direct water only from one fixed position, which limits coverage area and functionality. Many homeowners would like to upgrade their current showerhead system to include a plurality of different showerheads but find it difficult to install and costly to remodel. As such, there remains a need for a system that allows for additional showerheads to be added to a conventional wall supported shower arm with no behind the wall remodeling or new plumbing.

Furthermore, consumers have separate experiential preferences when using a conventional showerhead (typically mounted on a vertical wall at a 45 degree angle, for example) vs a raincan (typically mounted overhead as a pendant, for example). Typical use of a showerhead is for cleaning, which would usually have a more directed, or stronger flow of water. Typical use of a raincan would be for a spa-like experience, with a reduced flow rate, or perhaps a different, less direct spray pattern.

According to an illustrative embodiment of the present disclosure, an arc-shaped showerhead system includes a long, curved pipe that connects to an existing wall supported shower pipe and extends over the shower space to an opposite side where it mounts against the opposing shower wall. Multi-function showerheads can then be installed and interchanged along the pipe depending on the bather's needs and preferences. For example, dual showerheads can be installed for improved water coverage and/or for creating a double shower wherein a soothing, gentle raincan showerhead can be installed for an enhance shower experience. The existing faucet handle can activate water flow and/or control water temperature for all showerheads. The affordable system may be provided in a variety of sizes, styles and features to accommodate a number of shower spaces and user preferences.

According to another illustrative embodiment of the present disclosure, an overhead rail showerhead system includes a long, curved pipe that connects to an existing shower water line and extends over the shower space to the opposite side where it mounts against the opposing shower wall. The showerhead can then be securely positioned anywhere along the pipe, and the existing faucet handle can activate water flow and control water temperature. While bathing, the user can easily reposition the showerhead along the pipe to move and direct the water flow to best accommodate the user's tasks and preferences. This affordable showerhead system may be provided in a variety of sizes and styles to fit within a number of shower spaces.

The illustrative arc-shaped showerhead system is easy and affordable to install in an existing shower enclosure. Illustratively, an overhead arc/rail mounts to an existing shower arm connection and reaches over the entire tub wherein opposite ends of arc/rail mounts like a shower curtain rod. Further illustratively, three fixed shower head locations are supported by the overhead arc/rail. A primary shower arm may include vertical adjustment to account for variations in shower arm height and allows arc height to be maximized. A multi-function diverter allows a user to select various combinations of shower heads. Adjustments in the showerhead connections and/or arc/rail allows for variation in shower width.

The illustrative showerhead system of the present disclosure is easy and affordable to install in an existing shower and provides new, enhanced features. Furthermore, the illustrative showerhead system may include a showerhead configured to be moved along an overhead rail system in order to expand the water coverage area and/or add flexibility to the shower space.

The illustrative showerhead system allows a user to add additional showerheads (for example, one or two depending on configuration) without opening up the walls of the shower enclosure, replumbing, etc. It specifically allows a user to add an overhead shower which is of particular interest without giving up the conventional angled shower, which is often preferred by customers. Not only is adding an overhead shower head without losing the angled shower head desirable, but having water come from multiple directions (for example, two or three directions) at once is also desirable for a luxurious shower.

An arched showerhead system facilitates the use of multiple showerheads. In such an application, the illustrative system allows for both a "typical" showerhead experience, as well as a raincan experience, when multiple (e.g., two or three) configurable showerheads are utilized.

Illustratively, the multiple showerheads are able to be moved into proximity of one another so as to complement their designs or functions. This is accomplished by both showerheads being mounted in such a manner that at least one can be positioned freely. They can be physically and mechanically or magnetically connected.

The showerhead(s) has the ability to switch function (e.g., change water characteristics) when brought into proximity of another showerhead. This function could include switching spray settings, reducing flowrate, or otherwise modifying the showering experience.

According to an illustrative embodiment of the present disclosure, a showerhead system includes a water inlet, a vertical connecting support including a waterway fluidly coupled to the water inlet, and a horizontal connecting support including a waterway extending between a proximal end and a distal end, the waterway of the horizontal connecting support fluidly coupled to the waterway of the vertical connecting support. A height adjustment device is operably coupled to the vertical connecting support. A first showerhead is fluidly coupled to the water inlet. A second showerhead is positioned distally of the first showerhead and is fluidly coupled to the waterway of the horizontal connecting support.

According to a further illustrative embodiment of the present disclosure, a showerhead system includes a water inlet, an arched support extending between a proximal end and a distal end, the arched support curved upwardly toward a center portion from the proximal end and the distal end. A first showerhead is operably coupled to the arched support and is fluidly coupled to the water inlet. A second showerhead is operably coupled to the arched support distally of the first showerhead, the second showerhead fluidly coupled to the water inlet.

According to another illustrative embodiment of the present disclosure, a showerhead system includes a water inlet, and an arched support extending between a proximal end and a distal end, the arched support curved upwardly toward a center portion from the proximal end and the distal end. A proximal mount supports the proximal end of the arched support. A distal mount supports the distal end of the arched support. A first showerhead is supported by the proximal mount. A second showerhead is supported by the distal mount. The arched support includes a first fluid conduit and an outer cover receiving the first fluid conduit. The outer cover includes a proximal outer cover member and a distal outer cover member, the proximal outer cover member coupled to the proximal mount, and the distal cover member coupled to the distal mount. A center coupler couples the proximal outer cover member to the distal outer cover member. The first fluid conduit extends within the proximal outer cover, the center coupler and the distal outer cover to fluidly couple to the second showerhead.

According to a further illustrative embodiment of the present disclosure, a showerhead system includes a water inlet, and a support extending between a proximal end and a distal end, the support including a center portion positioned above the proximal end and the distal end. A first showerhead is supported by the support and is fluidly coupled to the water inlet. A second showerhead is supported by the support distally of the first showerhead and is fluidly coupled to the water inlet. A diverter valve is configured to control water flow from the water inlet to the first showerhead and the second showerhead. A length adjustment device is operably coupled to the support to adjust the distance between the proximal end and the distal end.

According to another illustrative embodiment of the present disclosure, a showerhead system includes a water inlet, and an arched support extending between a proximal end and a distal end, the arched support curved upwardly toward a center portion from the proximal end and the distal end. A first showerhead is supported for movement along the arched support and is fluidly coupled to the water inlet. Illustratively, a carriage includes a coupler fluidly coupled to the first showerhead, wherein the arched support includes a track supporting the carriage for sliding movement.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIGS. 26A-26D are perspective views showing the moveable showerhead of the showerhead system of FIG. 25 in different positions along an overhead support;

FIG. 30 is a perspective view of the proximal mount of FIG. 29, showing a manifold in a first configuration;

FIG. 34 is a perspective view of the showerhead system of FIG. 25 in a third configuration with a first moveable showerhead and a second moveable showerhead spaced apart from the first moveable showerhead;

FIG. 35 is a perspective view, with a partial cut-away, of the showerhead system of FIG. 34, showing the first moveable showerhead positioned proximate to the second moveable showerhead;

DETAILED DESCRIPTION OF THE DRAWINGS

Figure 1:
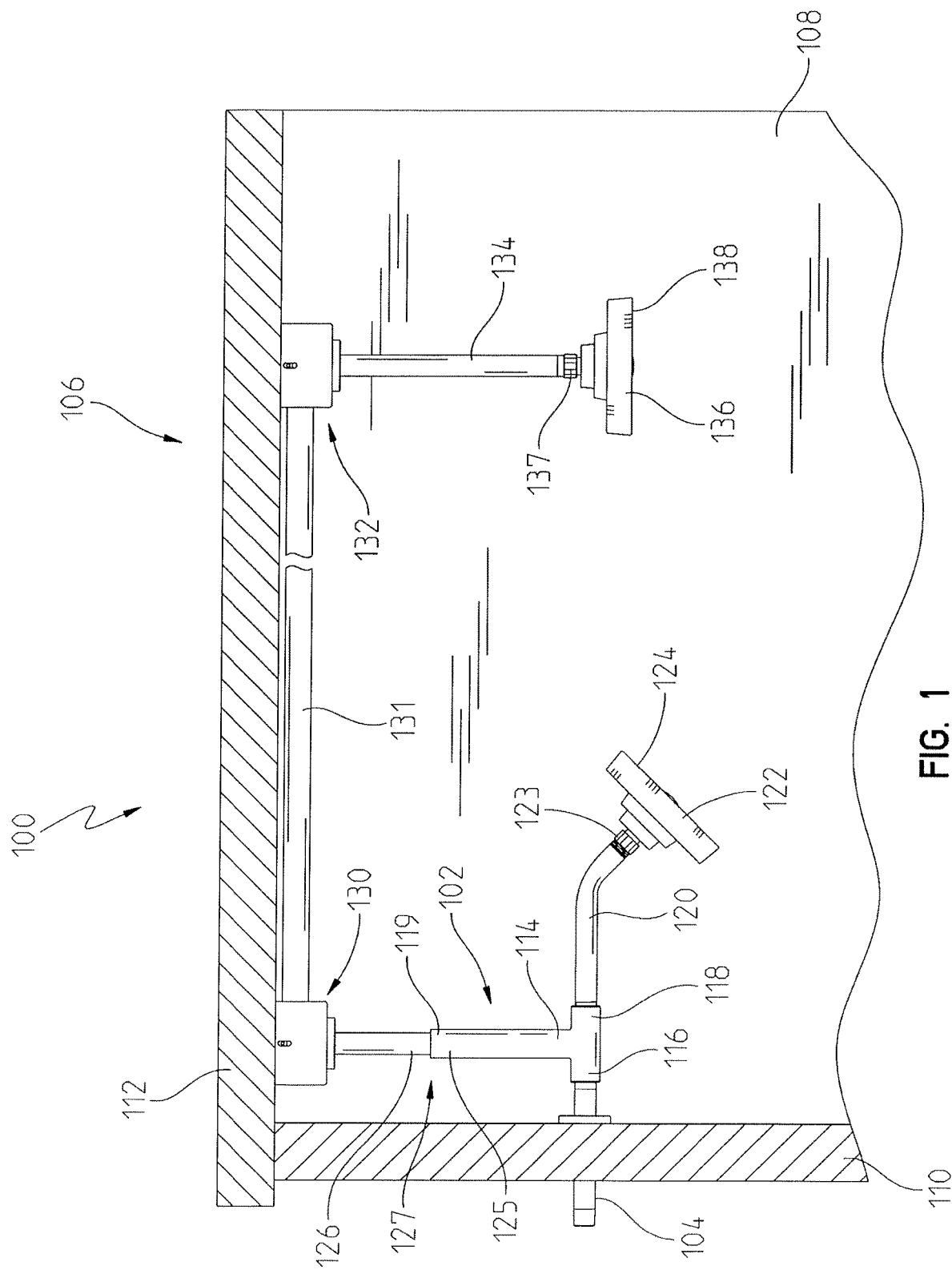
FIG. 1 is a side elevational view of an illustrative showerhead system of the present disclosure, with a portion of a shower enclosure shown in cross-section.

For the purposes of promoting and understanding the principles of the present disclosure, reference will now be made to the embodiments illustrated in the drawings, which are described herein.

With reference initially to FIGS. 1-6, an illustrative showerhead system 100 is shown as including a shower arm attachment or mount 102 added to a water supply, illustratively a conventional shower pipe 104 supported within a shower enclosure 106. The shower enclosure 106 illustratively includes a back wall 108, opposing end walls 110, and a ceiling 112. Illustratively, the shower pipe 104 is supported by and extends out of one of the vertical end walls 110.

Figure 2:
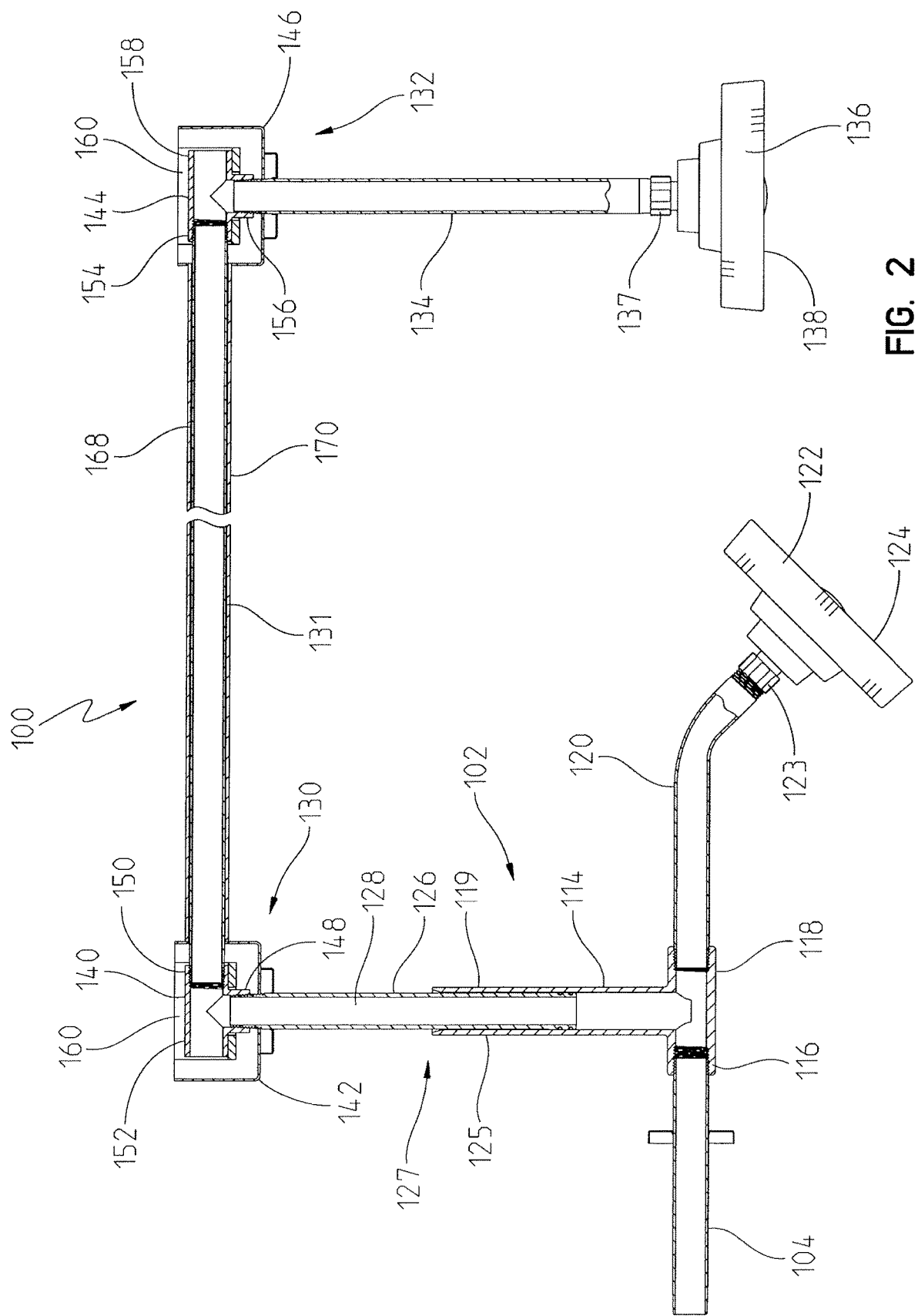
FIG. 2 is a partial cross-sectional view of the showerhead system of FIG. 1.

With further reference to FIGS. 1 and 2, the shower arm mount 102 illustratively includes an adjustable "T" fitting 114 including a horizontal first arm 116, a horizontal second arm 118, and a vertical arm 119. The first arm 116 defines an inlet fluidly coupled to the shower pipe 104. A conventional angled shower arm 120 supports a first or primary showerhead 122 and is fluidly coupled to an outlet defined by the second arm 118 of the "T" fitting 114. A coupler 123 fluidly couples the shower arm 120 to the showerhead 122. The showerhead 122 may be of conventional design as including a sprayface 124 including a plurality of fluid outlets for dispensing water. The sprayface 124 is illustratively angled between horizontal and vertical for dispensing water generally downward.

The vertical arm 119 of the "T" fitting 114 is illustratively defined by an outer tube 125. An inner tube 126 cooperates with the outer tube 125 to define a vertical or height adjustment device 127. The tubes 125 and 126 define a vertical connecting support including a waterway 128 which fluidly couples the shower arm mount 102 (and shower pipe 104) with a first or proximal mount 130. A horizontal connecting support 131 extends between the proximal mount 128 and a second or distal mount 132.

A straight shower arm 134 illustratively extends downward from the distal mount 132 and supports a second showerhead 136, illustratively as a pendant. A coupler 137 fluidly couples the shower arm 134 to the showerhead 136. The second showerhead 136 may be a conventional raincan showerhead having a sprayface 138 including a plurality of fluid outlets for dispensing water. The sprayface 138 illustratively extends horizontally for dispensing water downwardly along a vertical axis.

Figure 3:
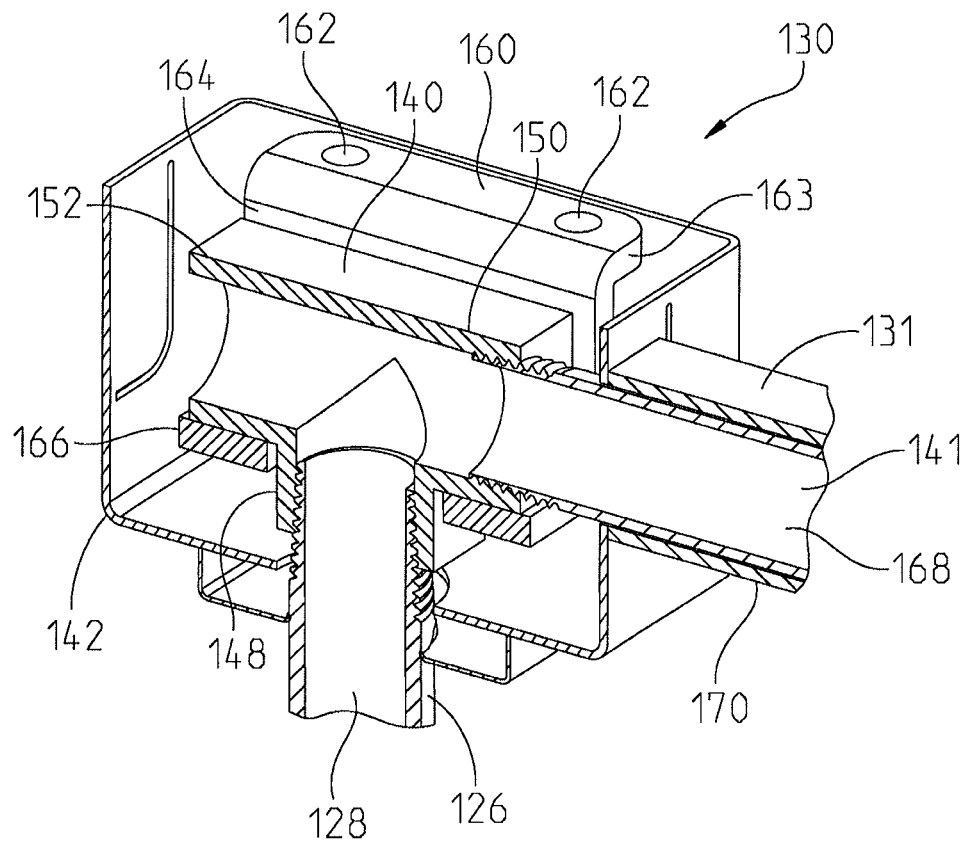
FIG. 3 is a cross-sectional view of an illustrative mount of the showerhead system of FIG. 1.

With reference to FIG. 3, the proximal mount 130 illustratively includes a fluid coupler 140 (e.g., an "L" coupler) fluidly coupling the waterway 128 of tubes 125 and 126 with a waterway 141 of the horizontal connecting support 131. A finished stamped brass or ABS plastic decorative cover or cap 142 illustratively receives the fluid coupler 140. The fluid coupler 140 illustratively includes a vertical arm 148, a horizontal first arm 150, and a horizontal second arm 152. The vertical arm 148 is fluidly coupled to the tube 126 and defines an inlet to the fluid coupler 140. The horizontal first arm 150 is fluidly coupled to the horizontal connecting support 131 and defines an outlet to the fluid coupler 140. In the illustrative embodiment, the horizontal second arm 152 may be sealed (for example by a plug (not shown)).

The distal mount 132 may be a substantial mirror image of the proximal mount 130. More particularly, the distal mount 132 illustratively includes a fluid coupler 144 (e.g., an "L" coupler) fluidly coupling the waterway 141 of the horizontal connecting support 131 with the shower arm 134. A finished stamped brass or ABS plastic decorative cover or cap 146 illustratively receives the fluid coupler 144. The fluid coupler 144 illustratively includes a horizontal first arm 154, a vertical arm 156, and a horizontal second arm 158. The horizontal first arm 154 is fluidly coupled to the horizontal connecting support 131 and defines an inlet to the fluid coupler 144. The vertical arm 156 is fluidly coupled the shower arm 134 and defines an outlet to the fluid coupler 144. In the illustrative embodiment, the horizontal second arm 158 may be sealed (for example by a plug (not shown)).

A bracket 160 illustratively secures the fluid couplers 140 and 144 of the proximal mount 130 and the distal mount 132, respectively, to the ceiling 112. More particularly, the bracket 160 illustratively includes apertures 162 within a mounting flange 163 to receive fasteners (such as threaded mounting screws). A web 164 couples the mounting flange 163 to a shelf 166 for supporting the respective fluid coupler 140, 144.

Figure 4:
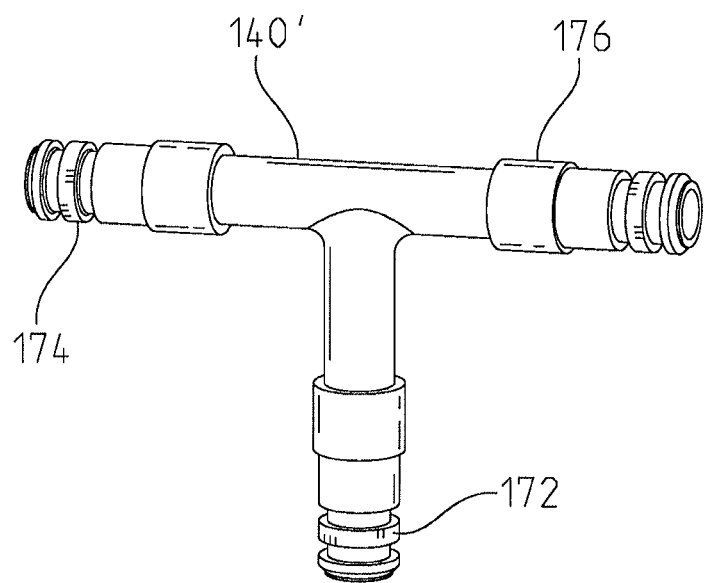
FIG. 4 is a perspective view of an alternative fluid coupler.

FIG. 4 shows an alternative fluid coupler 140' which may be used as a substitute for fluid couplers 140 and 144. The fluid coupler 140' is illustratively formed of a polymer and is held securely to the ceiling 112 with the bracket 160. The fluid coupler 140' illustratively includes a vertical arm 172, a horizontal first arm 174, and a horizontal second arm 176.

The horizontal connecting support 131 illustratively includes a fluid conduit or tube 168 (e.g., formed of brass) received within a finished square or round decorative outer tube 170, and is supported adjacent the ceiling 112. Opposing proximal and distal ends of the fluid conduit 168 are fluidly coupled to the fluid couplers 140 and 144 of the proximal and distal mounts 130 and 132, respectively.

Figure 6:
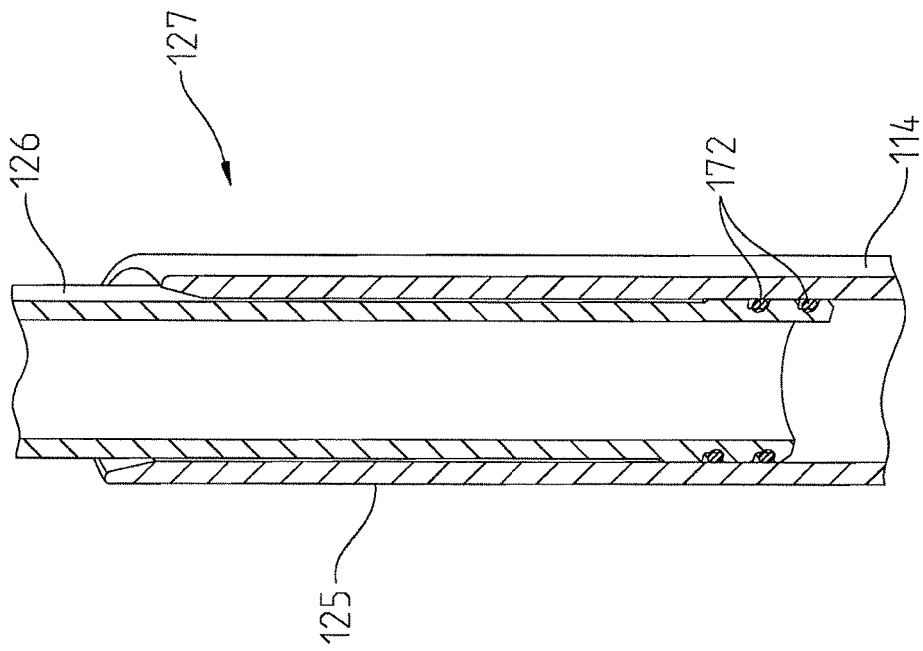
FIG. 6 is a detail view of the height adjustment device of FIG. 5.
Figure 5:
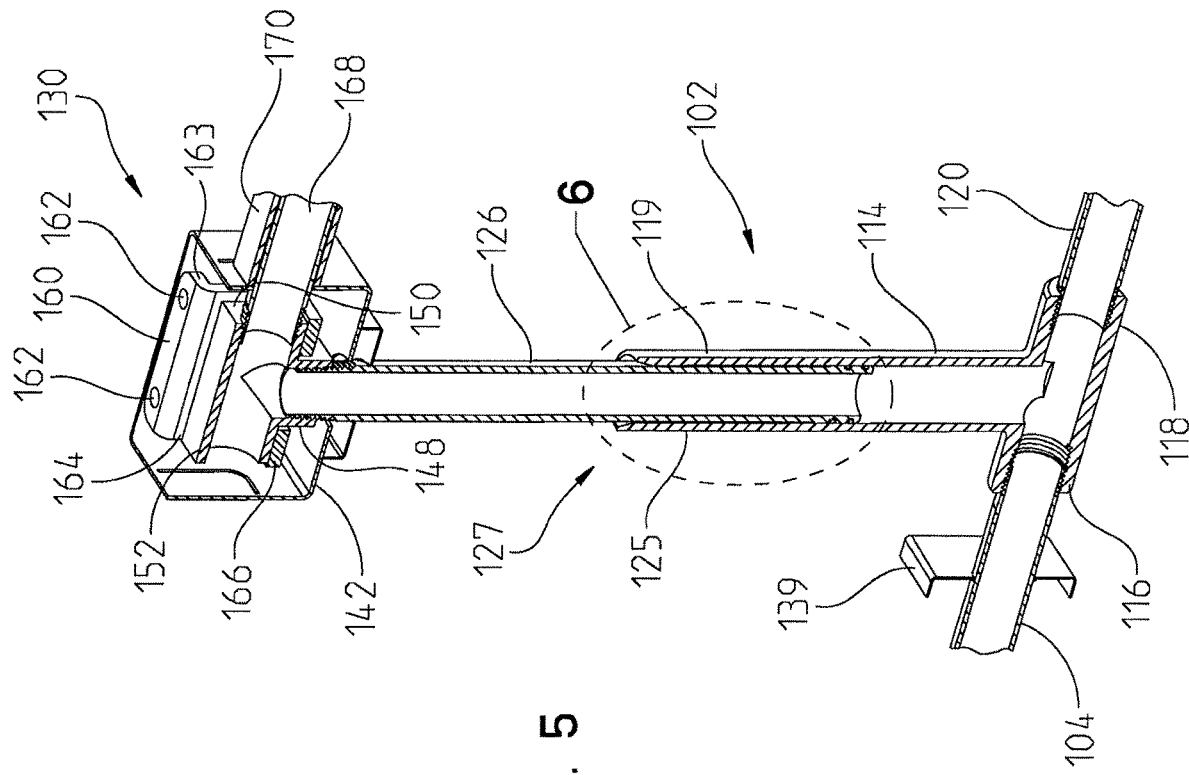
FIG. 5 is a partial cross-sectional view the showerhead system of FIG. 1, showing a height adjustment device.
Figure 7:
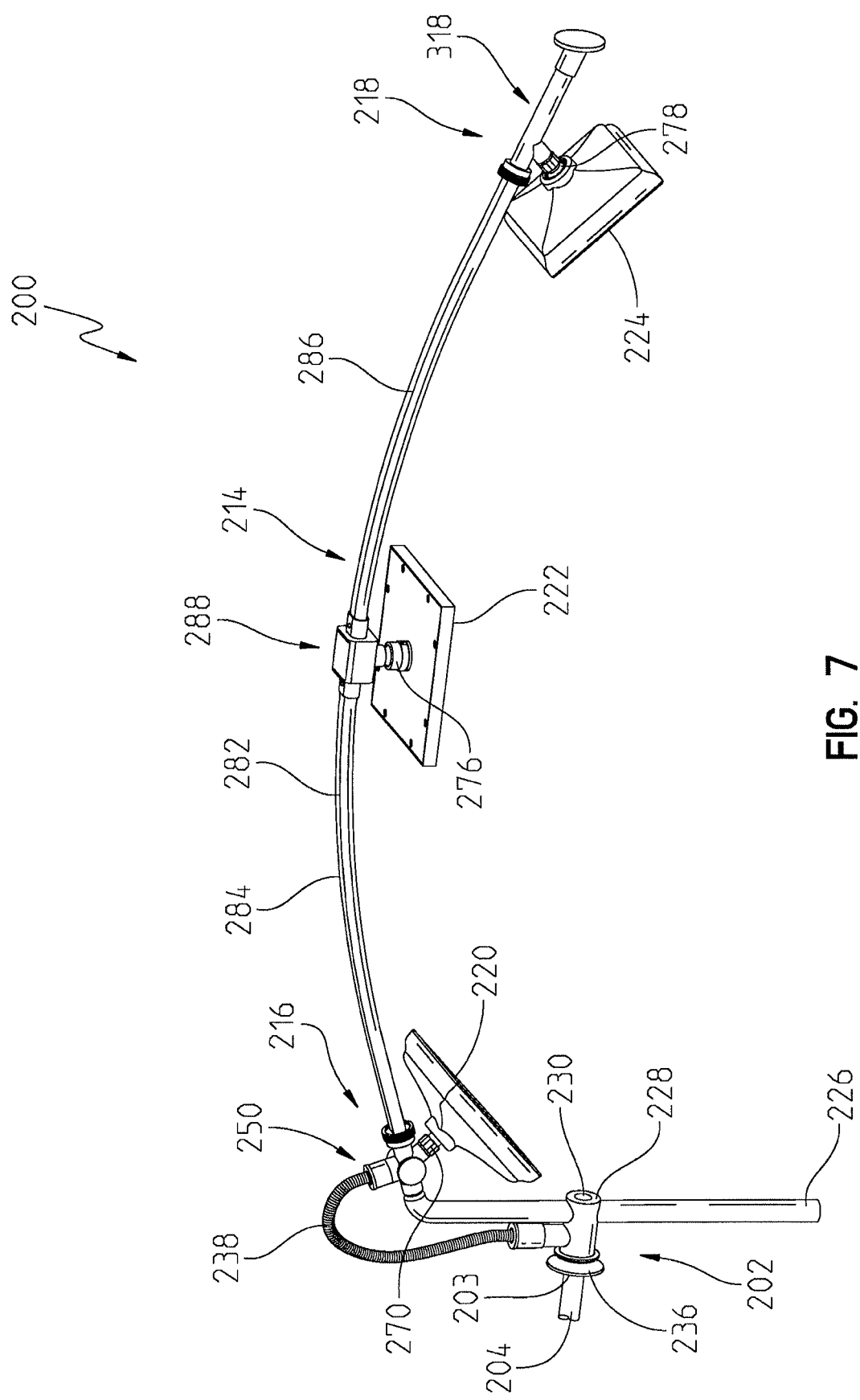
FIG. 7 is a perspective view of another illustrative showerhead system of the present disclosure.

As shown in FIGS. 5 and 6, the height adjustment device 127 is illustratively defined by the telescoping relationship of the outer tube 125 and the inner tube 126. More particularly, the tubes 125 and 126 the vertical arm of the "T" fitting 102 may provide for vertical adjustability relative to the proximal mount 130. O-ring seals 172 may be provided intermediate the tubes 125 and 126 to prevent water leakage.

With reference to FIGS. 7-10, a further illustrative showerhead system 200 includes a proximal mount 202, illustratively a shower arm attachment or fitting, including a water inlet 203 that connects directly to an existing shower pipe 204 supported within a conventional shower enclosure 206. The shower enclosure 206 illustratively includes a back wall 208, opposing end walls 210, 211 and a ceiling 212. Illustratively, the shower pipe 204 is supported by and extends out of the vertical end wall 210.

An arched support 214 extends between a proximal end 216 and a distal end 218. A first or proximal showerhead 220, a second or intermediate showerhead 222, and a third or distal showerhead 224 are operably coupled to the arched support 214 and fluidly coupled to the water inlet 203.

The proximal mount 202 illustratively defines a primary shower arm including an adjustable height arm 226 supported for vertical movement within a receiver 228. The adjustable height arm 226 supports the proximal end 216 of the arched support 214. By sliding the arm 226 within the receiver 228, a user adjusts the location of the arm 226 to meet a desired showerhead height. A lock 230, such as a set screw, is supported by the receiver 228 and may be tightened to set the desired height of the arm 226.

Figure 11:
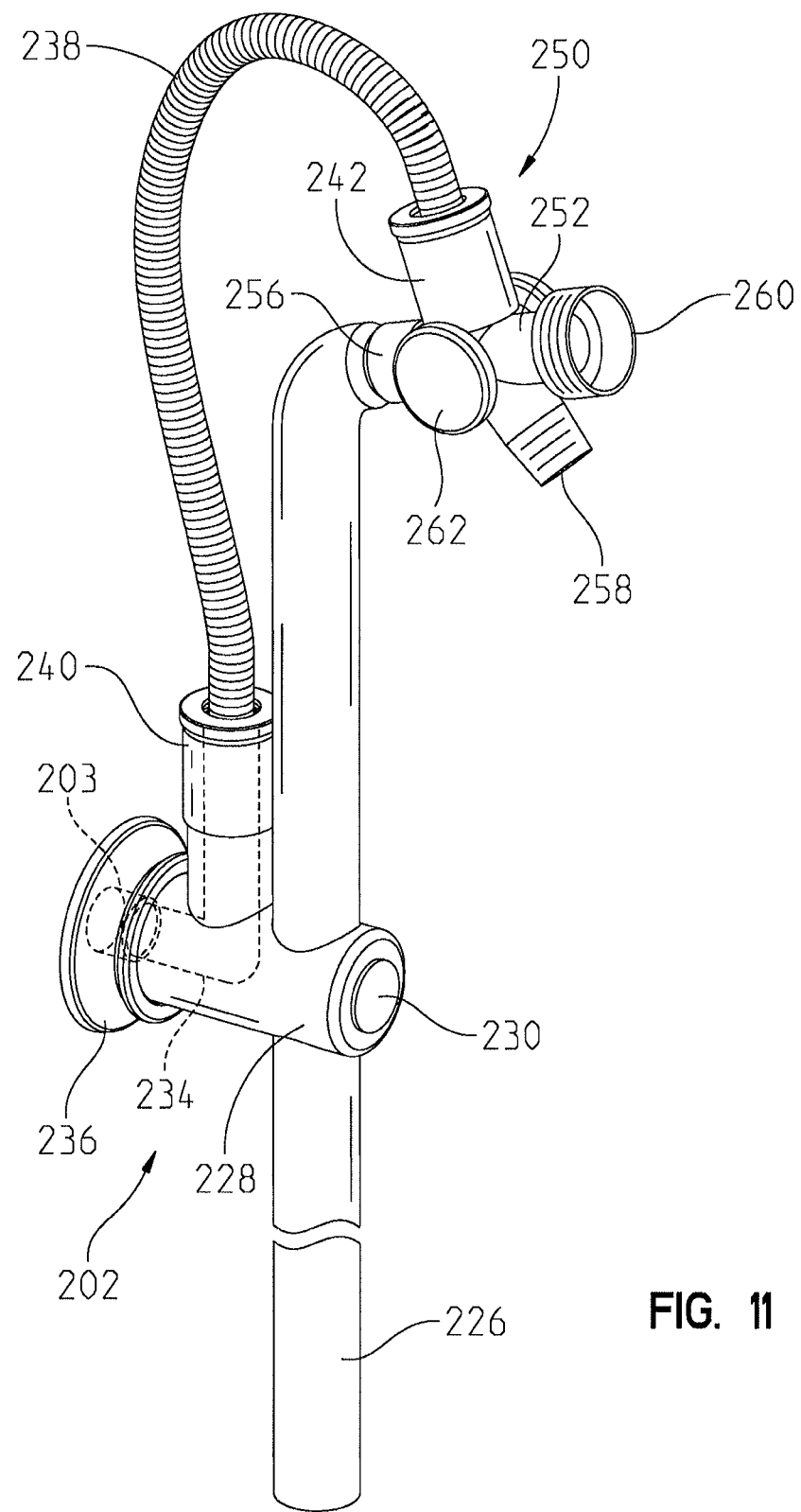
FIG. 11 is a perspective view of a proximal mount of the showerhead system of FIG. 7, defining a primary shower arm including a shower arm attachment.

With reference to FIG. 11, a passageway 234 is formed within the receiver 228 and is in fluid communication with the water inlet 203. A mounting flange 236 may be received over the receiver 228 for placement against the end wall 210. A flexible conduit or tube 238 is configured to provide fluid communication between the water inlet 203 and the arched support 214. The tube 238 is positioned external to the arm 226, and extends from a proximal or inlet coupler 240 and a distal or outlet coupler 242. The inlet coupler 240 is secured to an outlet 244 of the receiver 228, wherein the passageway 234 provides fluid communication between the tube 238 and the water inlet 203. The outlet coupler 242 is secured to an inlet 248 of a multi-function diverter valve 250. The tube 238 may be a single tube or multiple tubes as necessary to supply the appropriate water flow rate needed. The tube 238 can be a flexible and a single length tube that is visible to the user, or it can be a cut to desired length member that can then be covered with a decorative cap.

Figure 12:
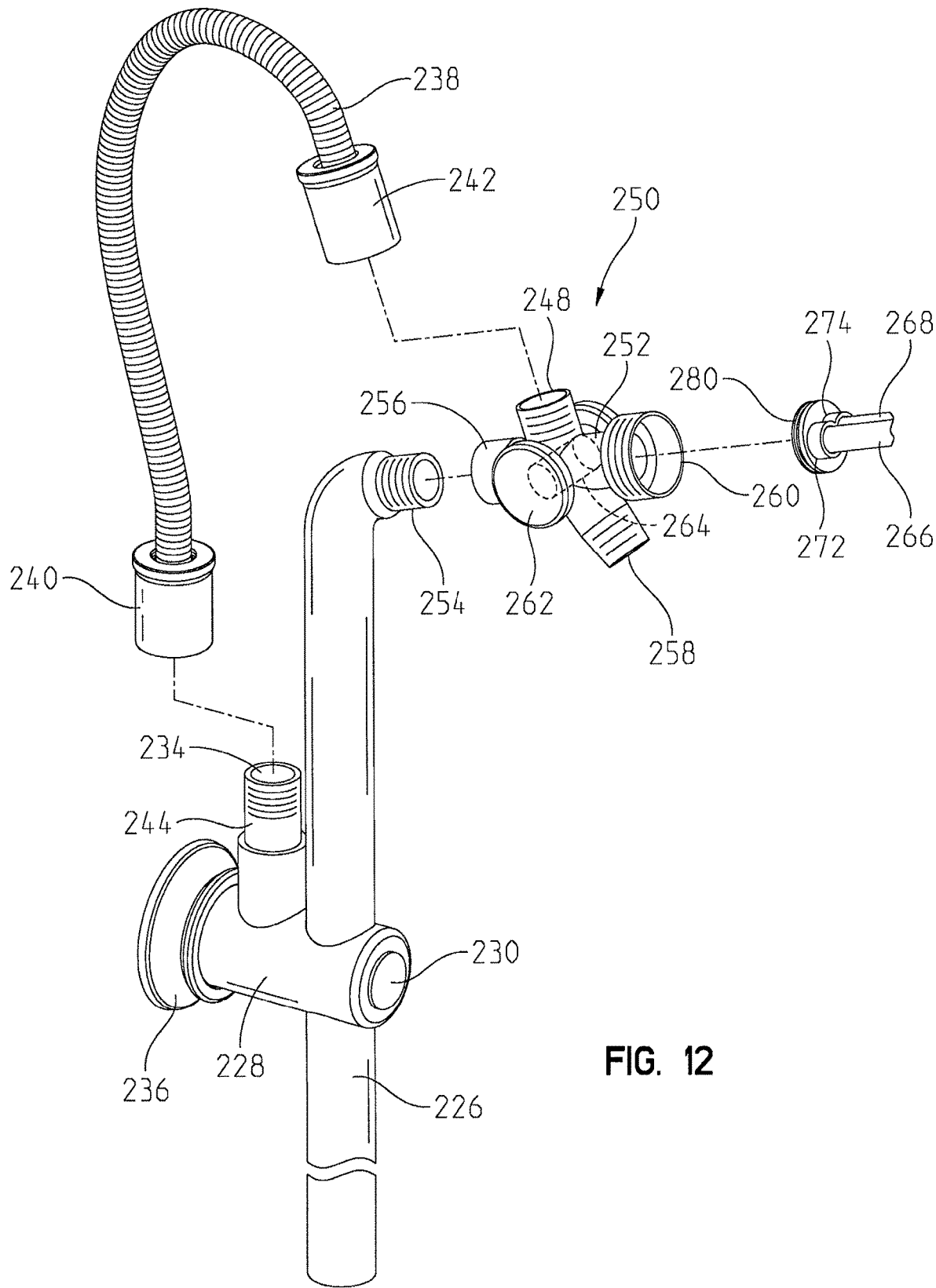
FIG. 12 is an exploded perspective view of the proximal mount of FIG. 11, showing an adjustable height arm and a multi-function diverter.

As shown in FIGS. 11 and 12, the multi-function diverter valve 250 may be located at the top of the adjustable height arm 226. Illustratively, the diverter valve 250 includes a body 252 including a socket 256 secured to a threaded coupler 254 at the upper end of the arm 226. Alternatively, the diverter valve 250 may be located on the receiver 228, which keeps the diverter 250 at a height that is consistent with conventional shower arm locations. In another illustrative embodiment, the diverter valve 250 may be located at the bottom of the adjustable height arm 226, which would keep the diverter 250 at the lowest possible point for the user (but hose 238 may then need to run up thru the adjustable height arm 226).

The multi-function diverter valve 250 may be of conventional design including the inlet 248, a first outlet 258 (in fluid communication with a fluid coupler 270 of the first showerhead 220) and a second outlet 260 (in fluid communication with first and second fluid conduits or tubes 266 and 268). A user interface, such as a dial 262, is operably coupled to a valve member 264. In an illustrative embodiment, rotation of the dial 262 causes movement of the valve member 264 to control water flow from the inlet 203 (via the inlet 218) to one or both of the outlets 258 and 260. As further detailed below, the second outlet 260 may be divided into second and third outlets 272 and 274 fluidly coupled to intermediate showerhead 222 and distal showerhead 224. According to an illustrative embodiment, user operation of the diverter valve 250 causes water to divert from the inlet 218 to any of the three outlets 258, 272, 274 individually or in pairs (i.e., a 6-way diverter valve).

With reference to FIGS. 11 and 12, the illustrative overhead arched support 214 includes first and second fluid conduits or tubes 266 and 268 having inlets fluidly coupled to the first and second outlets 272 and 274, respectively. The tubes 266 and 268 are illustratively formed of a cross-linked polyethylene (PEX), the proximal ends of which are molded to a proximal fluid coupler, illustratively a puck 280. The first tube 266 is shorter than the second tube 268. Illustratively, the short tube 266 connects to the intermediate showerhead 222, and the long tube 268 connects to the distal showerhead 224 on the far or distal side. The showerheads 220, 222 and 224 may be of conventional design, wherein the intermediate showerhead 222 is illustratively an overhead raincan.

The overhead arched support 214 includes an outer cover 282 illustratively a decorative cover or trim. Illustratively, for ease of manufacturing, shipping and installation, the outer cover 282 is formed of at least two pieces, a proximal outer cover member 284 and a distal outer cover member 286. A center coupler 288 illustratively secures together the proximal outer cover member 284 and the distal outer cover member 286.

Figure 13:
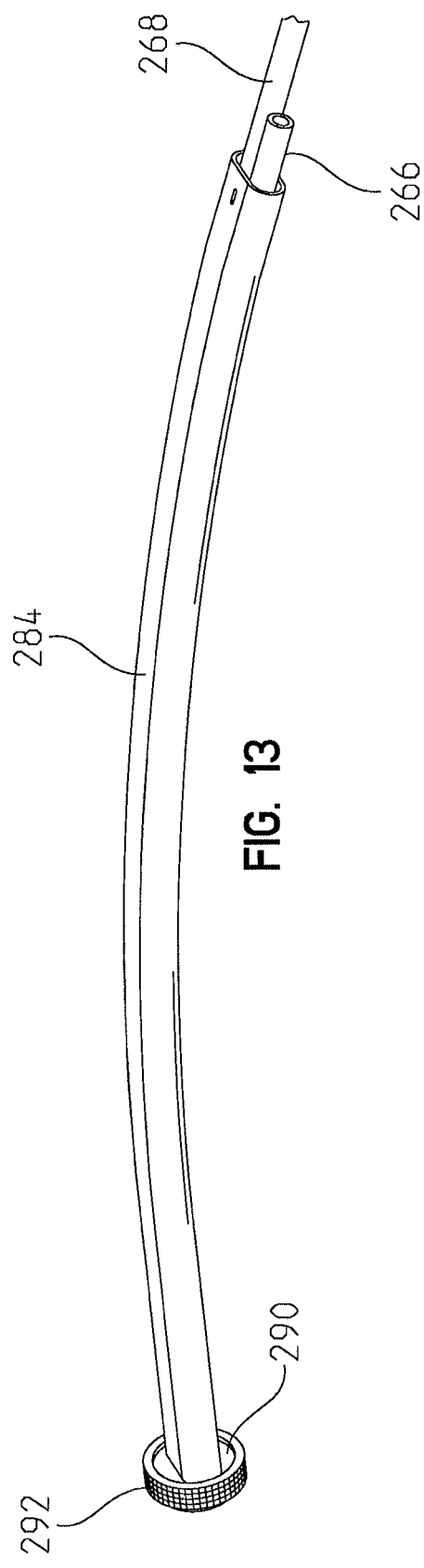
FIG. 13 is a partial perspective view of an overhead support of the showerhead system of FIG. 7, showing a decorative cover receiving water conduits.
Figure 14:
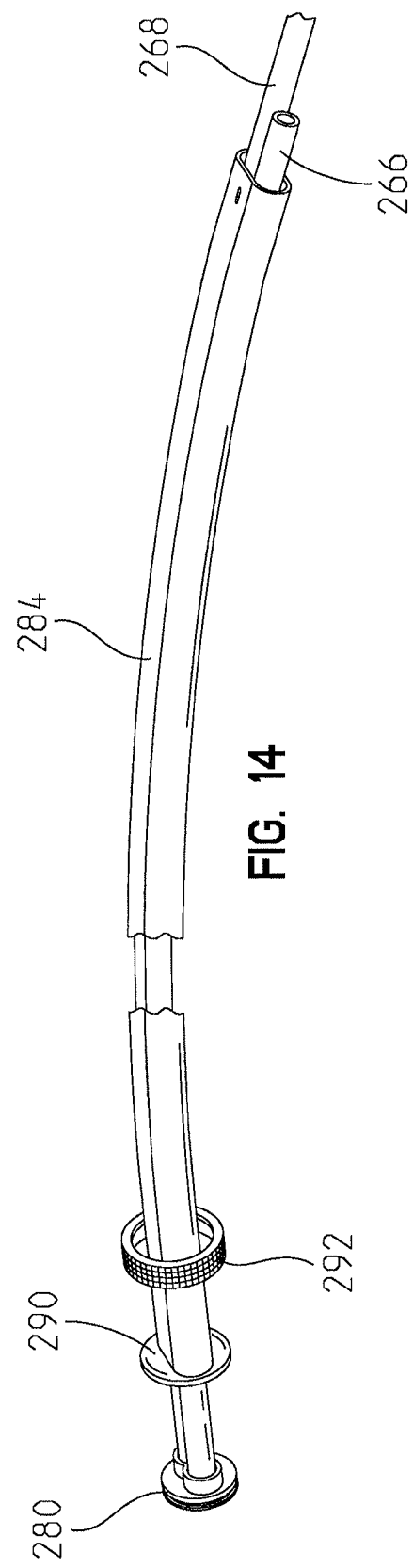
FIG. 14 is an exploded perspective view, with a partial cut-away, of the overhead support of FIG. 13.

With reference to FIGS. 13 and 14, the proximal outer cover member 284 includes a retaining disc 290 that is captured by a mounting nut 292 that threadably secures to the second outlet 260 of diverter valve body 252. During installation, the mounting nut 292 may be slidably received over the proximal outer cover member 284. The puck 280 is illustratively secured within the second outlet 260 of the diverter valve body 252 by the retaining disc 290.

Figure 15:
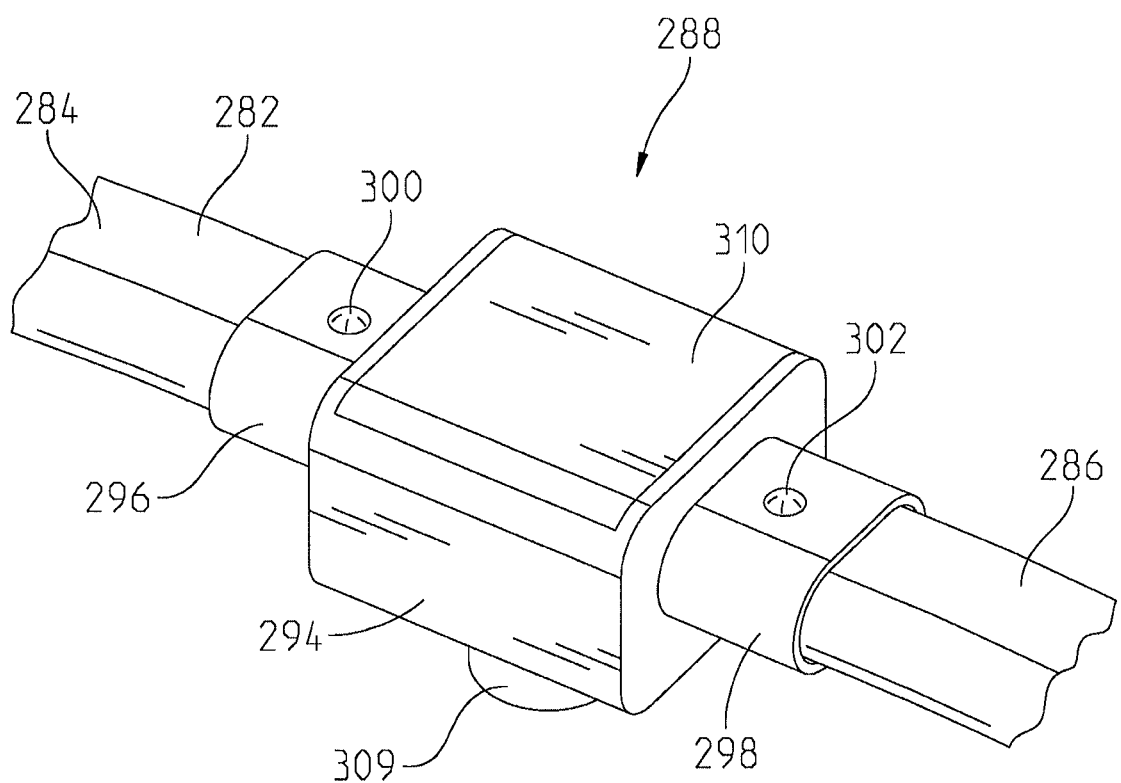
FIG. 15 is a perspective view of a center coupler of the showerhead system of FIG. 7.
Figure 16:
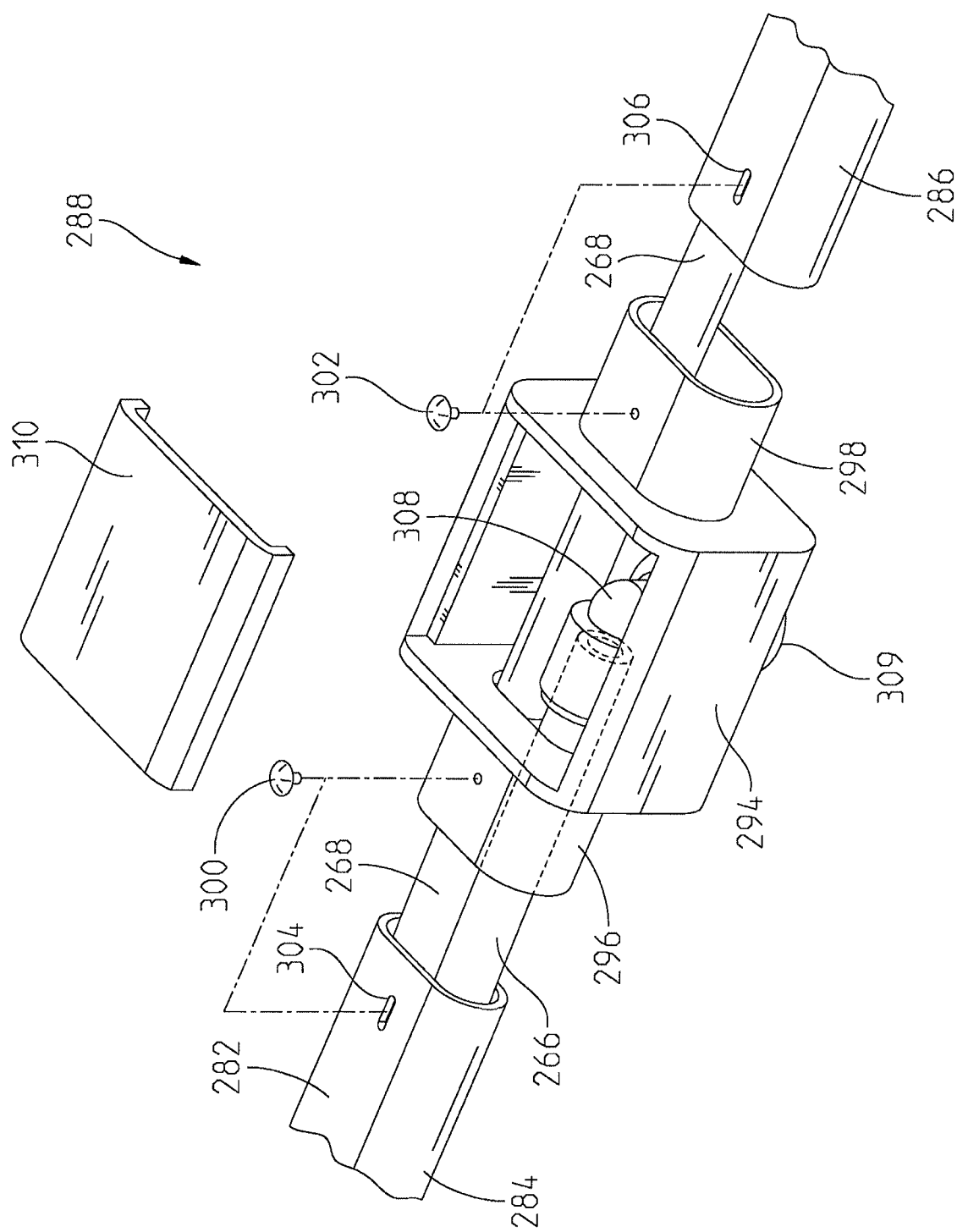
FIG. 16 is an exploded perspective view of the center coupler of FIG. 15.
Figure 17:
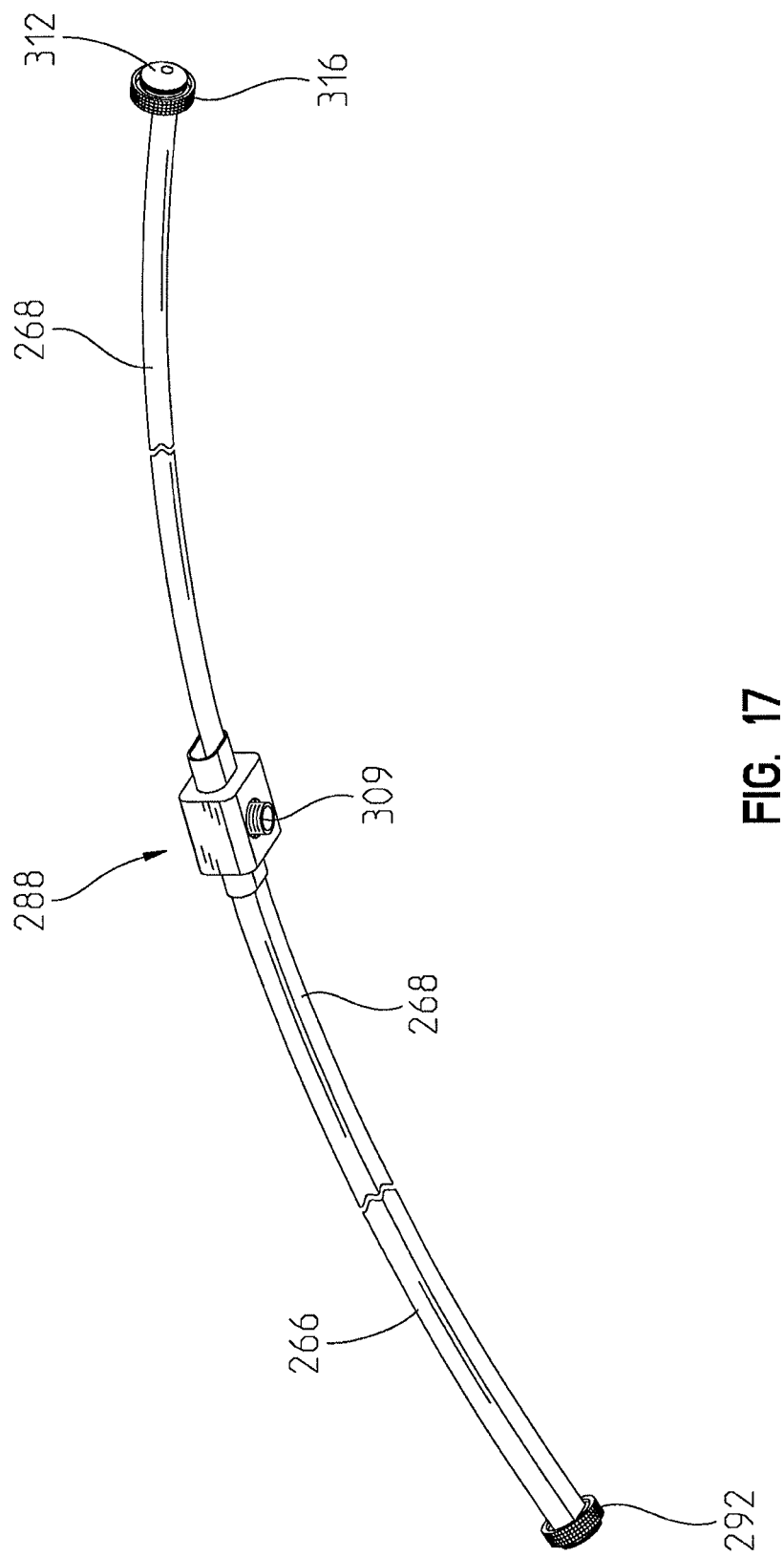
FIG. 17 is a lower perspective view of the overhead support of the showerhead system of FIG. 7.

With reference to FIGS. 15 and 16, the illustrative center coupler 288 includes a housing 294 supporting a first or proximal extension 296 and a second or distal extension 298. The distal end of the proximal outer cover member 284 is received within the proximal extension 296, and the proximal end of the distal outer cover member 286 is received within the distal extension 298. A fastener, such as a pin or bolt 300, extends through a slot 304 formed within the proximal outer cover member 284 to secure to the extension 296. A fastener, such as a pin or bolt 302, extends through a slot 306 formed within the distal outer cover member 286 to secure to the extension 298. The slots 304 and 306 allow for variation in shower or tub/shower width. More particularly, the slots 304 and 306 allow for length adjustment of the outer cover members 284 and 286 relative to the housing 294.

The tube 266 extends through the proximal extension 296 of the housing 294 to an L-shaped connector 308 coupled to a fluid coupling 309. The fluid coupling 309 is illustratively in fluid communication with a fluid coupler 276 of the intermediate showerhead 222, such that the center coupler 288 supports the showerhead 222. The tube 268 passes through the extension 296, the housing 294 and the extension 298 and is in fluid communication with the distal showerhead 224. A cover 310 is illustratively supported on top of the housing 294 to aid in cleanability and service of the center coupler 288.

Figure 8:
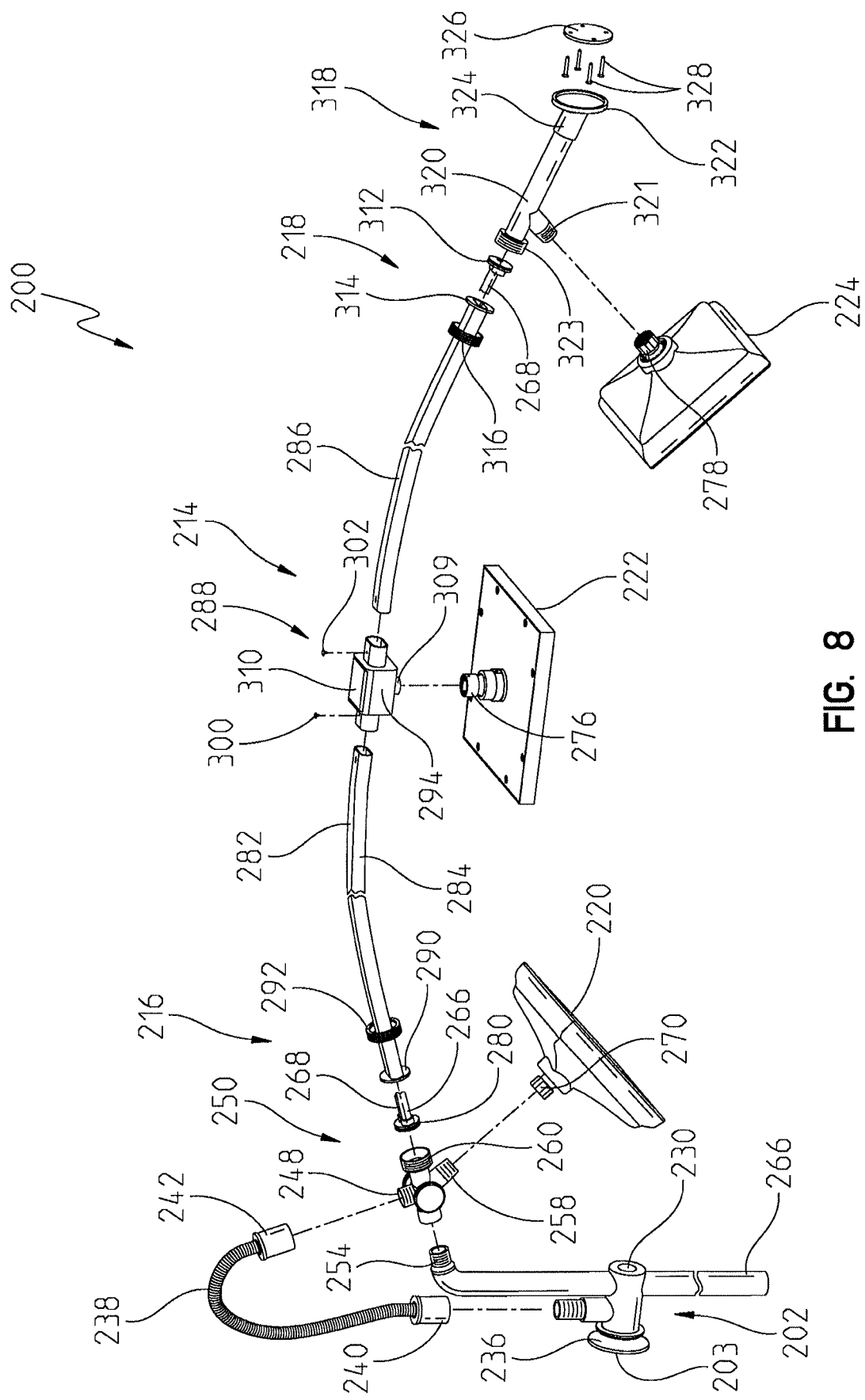
FIG. 8 is an exploded perspective view of the illustrative showerhead system of FIG. 7.

With reference to FIGS. 8 and 12, the distal end of the tube 268 is molded to a distal fluid coupler, illustratively a puck 312. A distal mount 318 illustratively supports the distal end 218 of the arched support 214. The distal mount 318 includes a secondary shower arm 320 including an outlet 321 fluidly coupled to a fluid coupler 278 of the distal showerhead 224. The shower arm 320 includes an inlet 323 configured to fluidly couple with the tube 268 via the puck 312.

The distal outer cover member 286 includes a retaining disc 314 that is captured by a mounting nut 316 that threadably secures to the inlet 323. During installation, the mounting nut 316 may be slidably received over the distal outer cover member 286. The puck 312 is illustratively secured within the inlet 323 of the shower arm 320 by the retaining disc 290.

Figure 18:
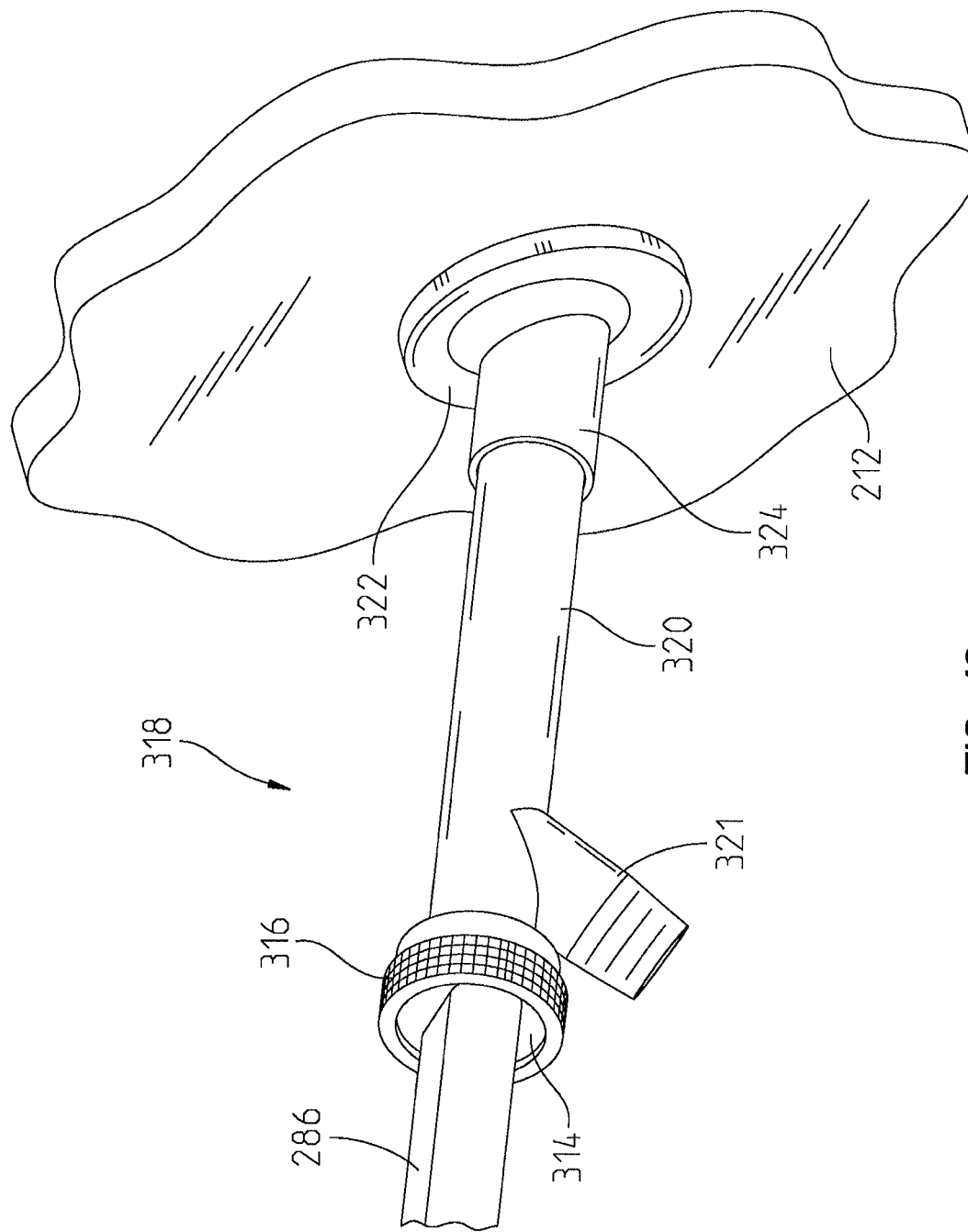
FIG. 18 is a perspective view of the distal mount of the showerhead system of FIG. 7, defining a secondary shower arm.
Figure 19:
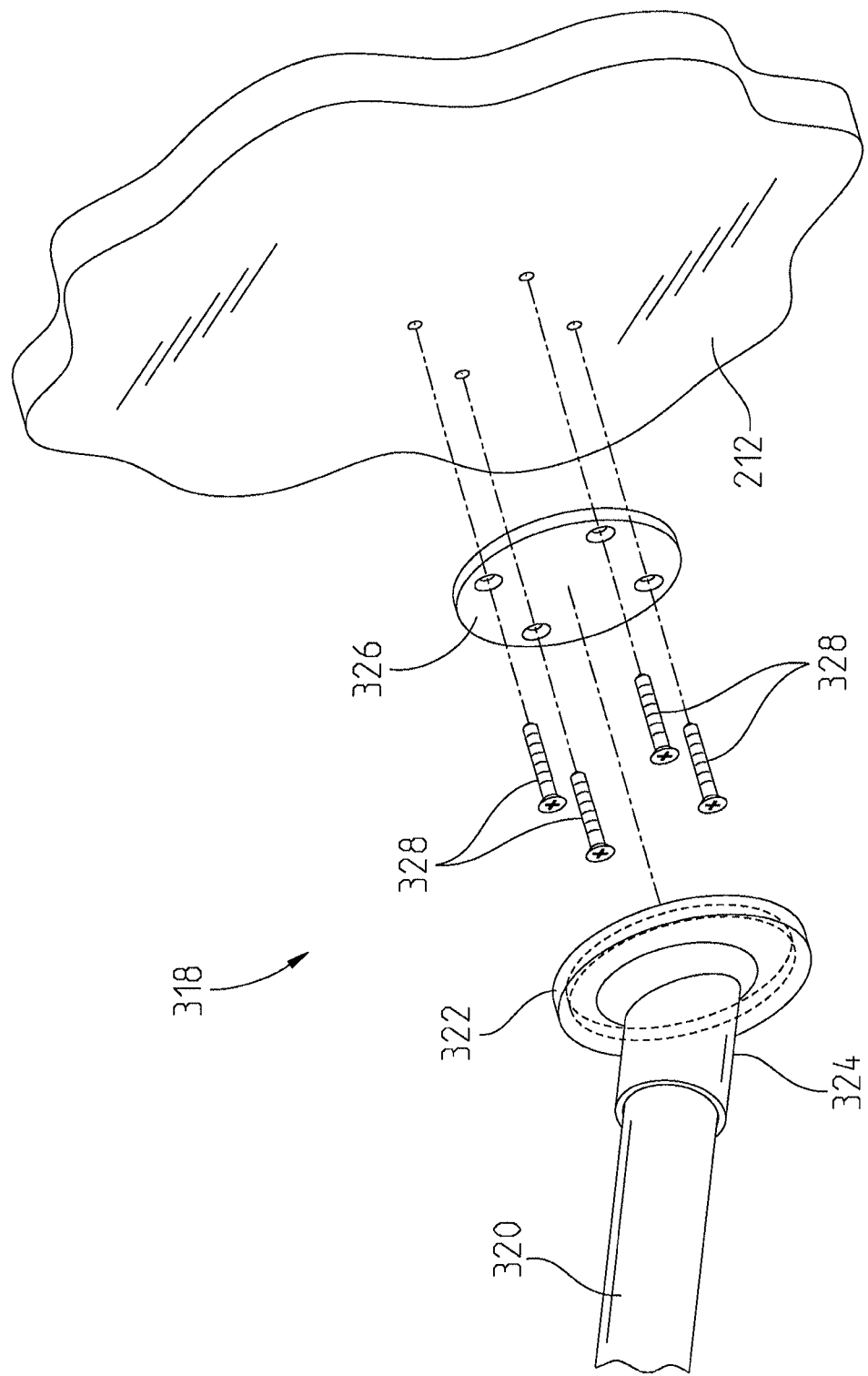
FIG. 19 is an exploded perspective view of the distal mount of FIG. 18.
Figure 20:
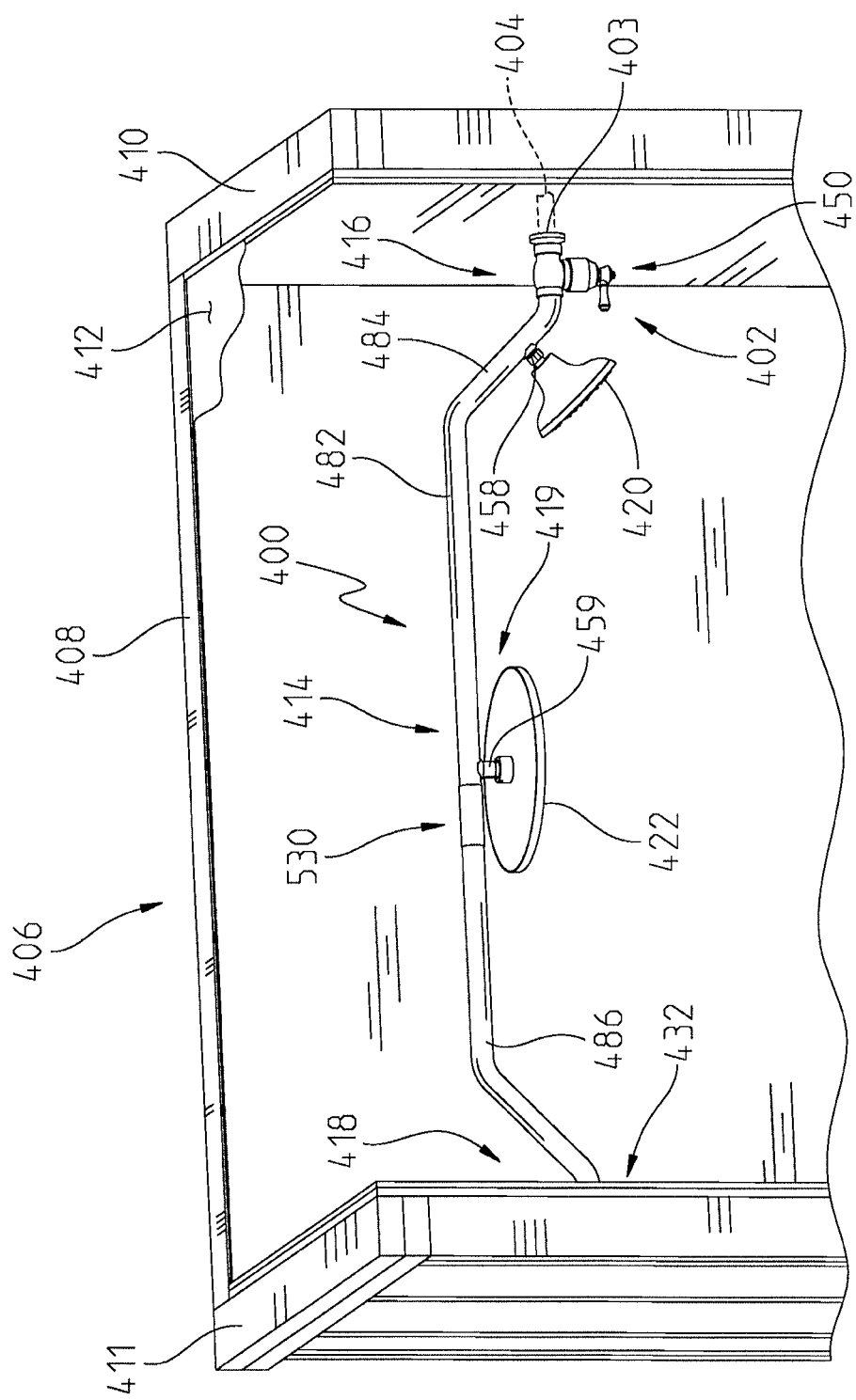
FIG. 20 is a perspective view of a further illustrative showerhead system of the present disclosure, shown coupled within a shower enclosure.
Figure 21:
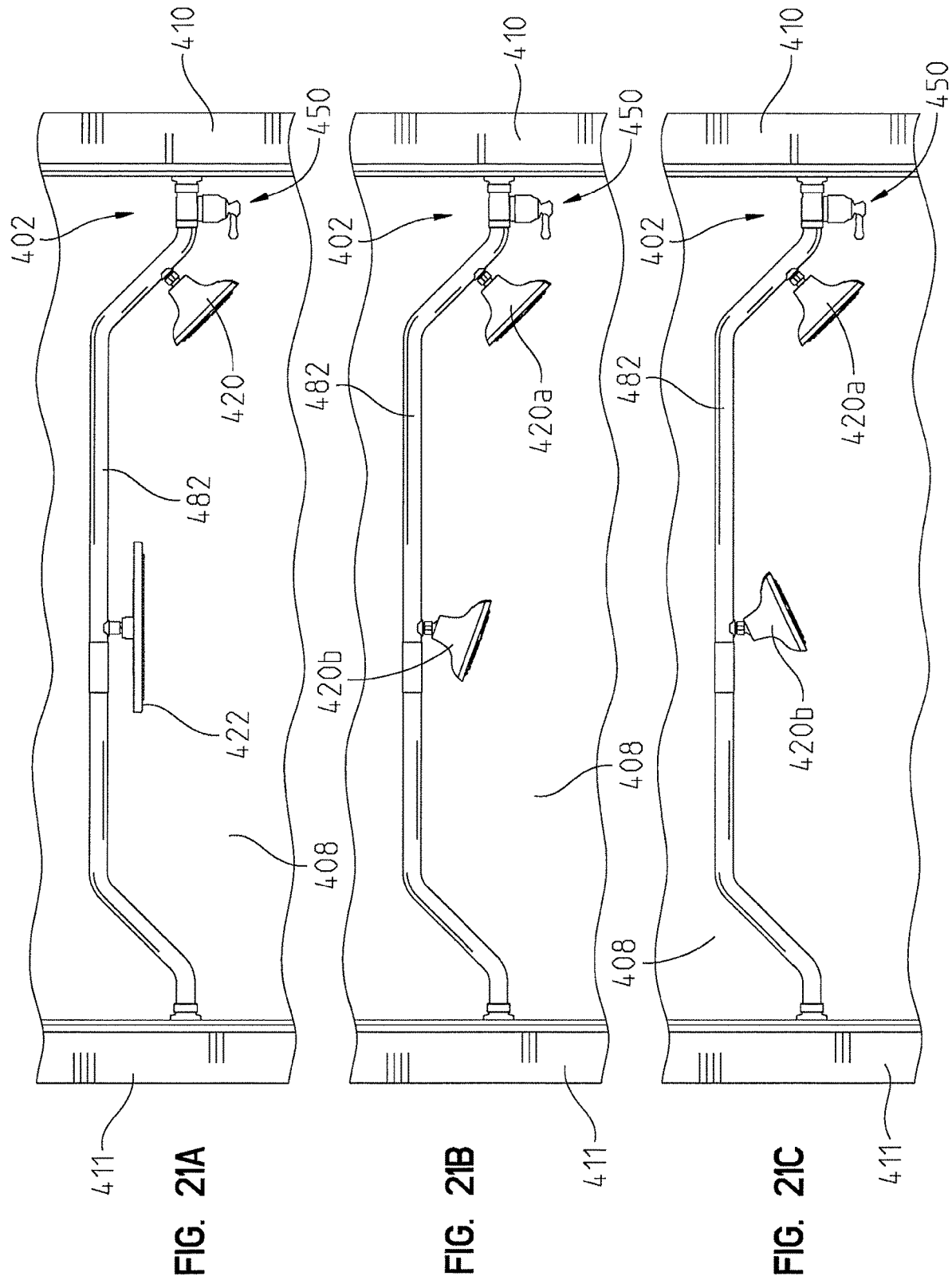
FIGS. 21A-21C are side elevational views showing different illustrative showerhead configurations of the showerhead system of FIG. 20.

With reference to FIGS. 8, 18 and 19, the secondary shower arm 320 is secured to the end wall 212 via a bracket 322 including a receiver 324. The bracket 322 may be threadably secured to a base 326 which, in turn, is secured to the end wall 212 via fasteners, such as screws 328.

During installation, the height of the primary shower arm 202 can be adjusted for proper clearance to the ceiling 212. A user can then mark the location for the wall bracket 322 of the secondary shower arm 320.

Figure 9:
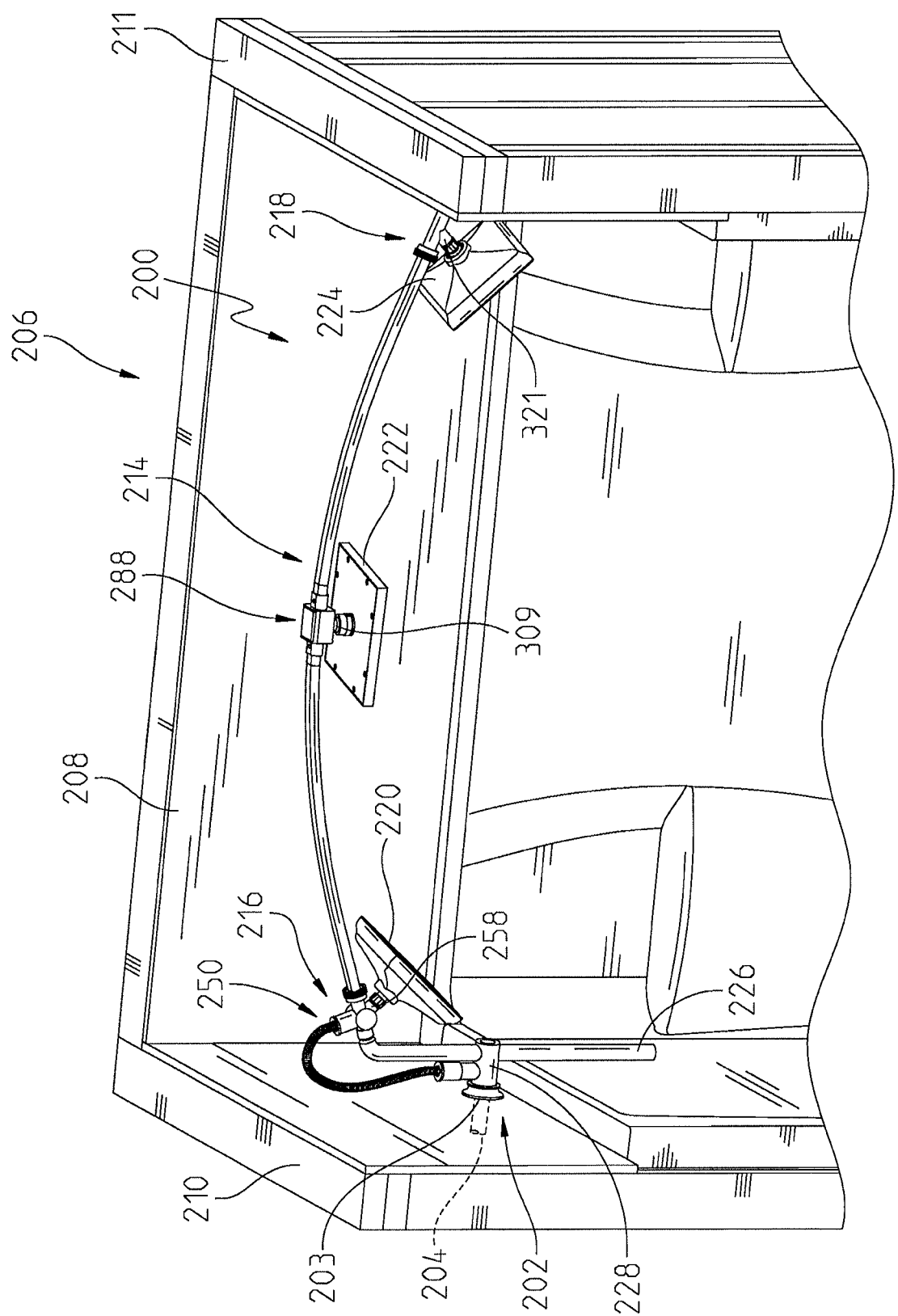
FIG. 9 is a perspective view of the showerhead system of FIG. 7 coupled within a shower enclosure.
Figure 10:
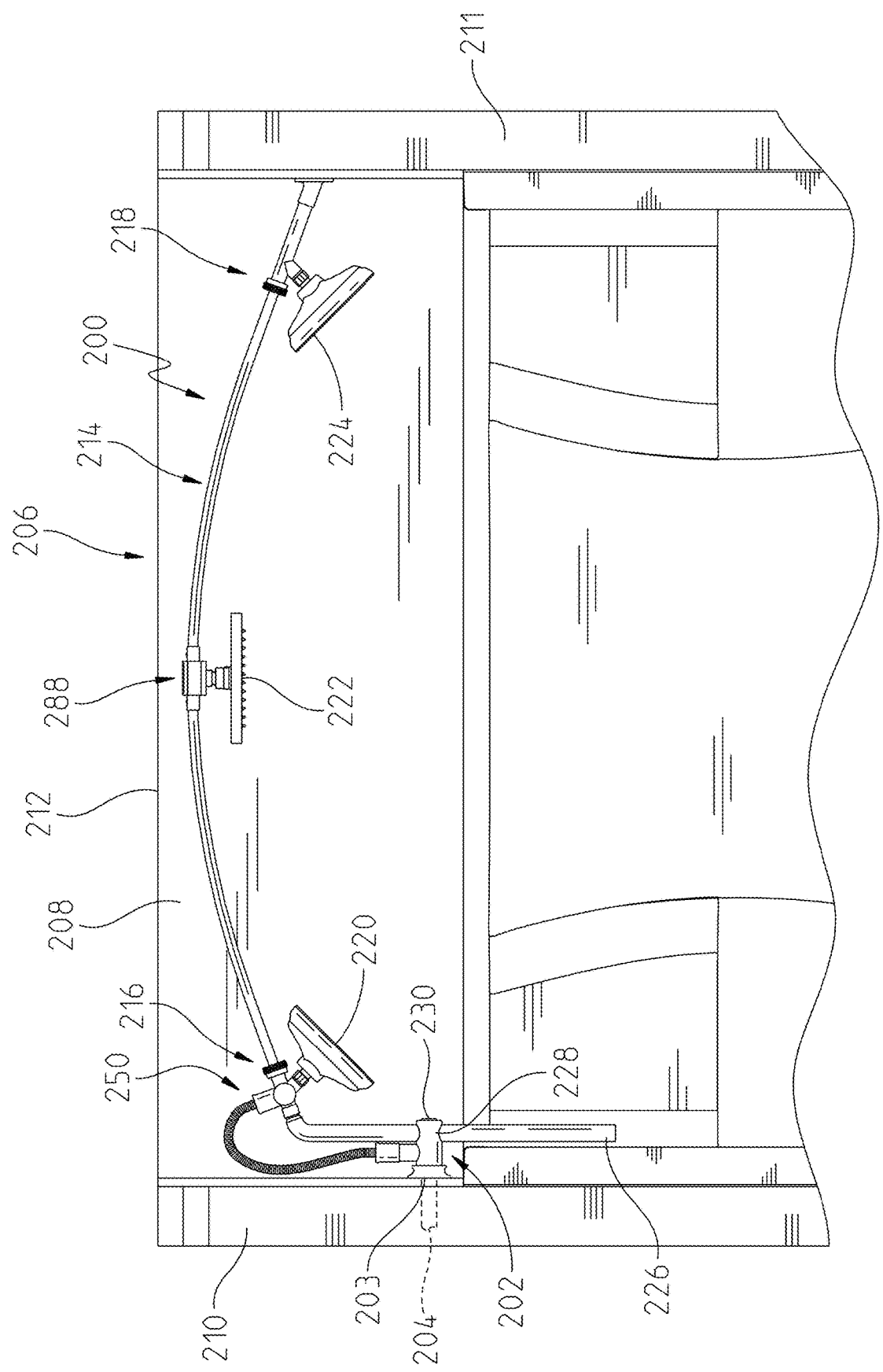
FIG. 10 is a side elevational view of the showerhead system of FIG. 9, showing an arched support coupled within the shower enclosure via a proximal mount and a distal mount.

Once the bracket 322 has been mounted, the arched support 214 can be lowered into place. When the arched support 214 is in place, the secondary shower arm 320 may be slid into receiver 324, and the nut 316 may tightened onto the adjustable shower arm 320. As shown in FIGS. 9 and 10, a variety of different showerheads 220, 222 and 224 may be fluidly coupled to and supported by the arched support 214.

The arc system 200 allows multiple showerheads to be added to existing tub-shower by connecting to existing shower arm plumbing connection and extending the arc to the opposite end of the shower. The system 200 also provides for height adjustability to account for a large range of variations in shower arm plumbed height. We are able to account for small variations in tub or shower width using the pin and slots in the decorative cover 282 and arc center coupler 288. The water line arrangement and incorporation of a diverter 250 allows any combination of showerheads 220, 222, 224 to be operated. The system 200 easily mounts directly to the current shower arm location with no modifications to existing plumbing.

With reference now to FIGS. 20-24, a further illustrative showerhead system 400 includes a proximal mount 402, illustratively a shower arm attachment or fitting, including a water inlet 403 that connects directly to an existing shower pipe 404 supported within a conventional shower enclosure 406. The shower enclosure 406 illustratively includes a back wall 408, opposing end walls 410, 411 and a ceiling 412. Illustratively, the shower pipe 404 is supported by and extends out of the vertical end wall 410.

A structural metal frame (tube) or overhead support 414 extends from the existing shower outlet 404 across the shower from a proximal end 416 to a distal end 418. A center portion 419 of the overhead support 414 is positioned above the proximal end 416 and the distal end 418 of the overhead support 414. A proximal mount 402 couples the proximal end 416 of the overhead support 414 to the end wall 410, and a distal mount 432 couples the distal end 418 of the overhead support 414 to the end wall 411.

The overhead support 414 is illustratively designed for a shower enclosure having a width of 60 inches, but could accommodate a shower enclosure having a width of 54 inches to 66 inches, if desired. The overhead support 414 supports and is in fluid communication with a proximal showerhead 420 and a distal showerhead 422. Illustratively, fluid conduits 466 and 468 are received within an outer cover 482 and in fluid communication with a fluid couplings 458 and 459, respectively. The fluid couplings 458 and 459, in turn, are in fluid communication with the showerheads 420 and 422.

Different illustrative showerhead combinations are shown in FIGS. 21A-21C. FIG. 21A illustrates a rain shower combination including an angled showerhead 420 and a rain can 422. FIG. 21B illustrates a two person shower combination including a pair of angled showerheads 420a and 420b discharging water in generally the same direction. FIG. 21C illustrates a converging showerhead combination including a pair of showerheads 420a and 420b discharging water in converging directions.

A diverter valve 450 is operably coupled to the overhead support 414 to control which showerhead(s) 420, 422 are active. The diverter valve 450 may be of conventional design such that multiple showerheads 420, 422 can be active at one time. The diverter valve 450 illustratively includes a valve body 514 receiving a valve cartridge 518 which is operably coupled to a handle 516. The valve cartridge 518 controls water flow from a valve inlet 520 to one of both of valve outlets 522 and 524 which are fluidly coupled to the fluid conduits 466 and 468, respectively. In turn, the fluid conduits 466 and 468 are fluidly coupled to fluid couplings 458 and 459, and to showerheads 420 and 422, respectively.

Figure 22:
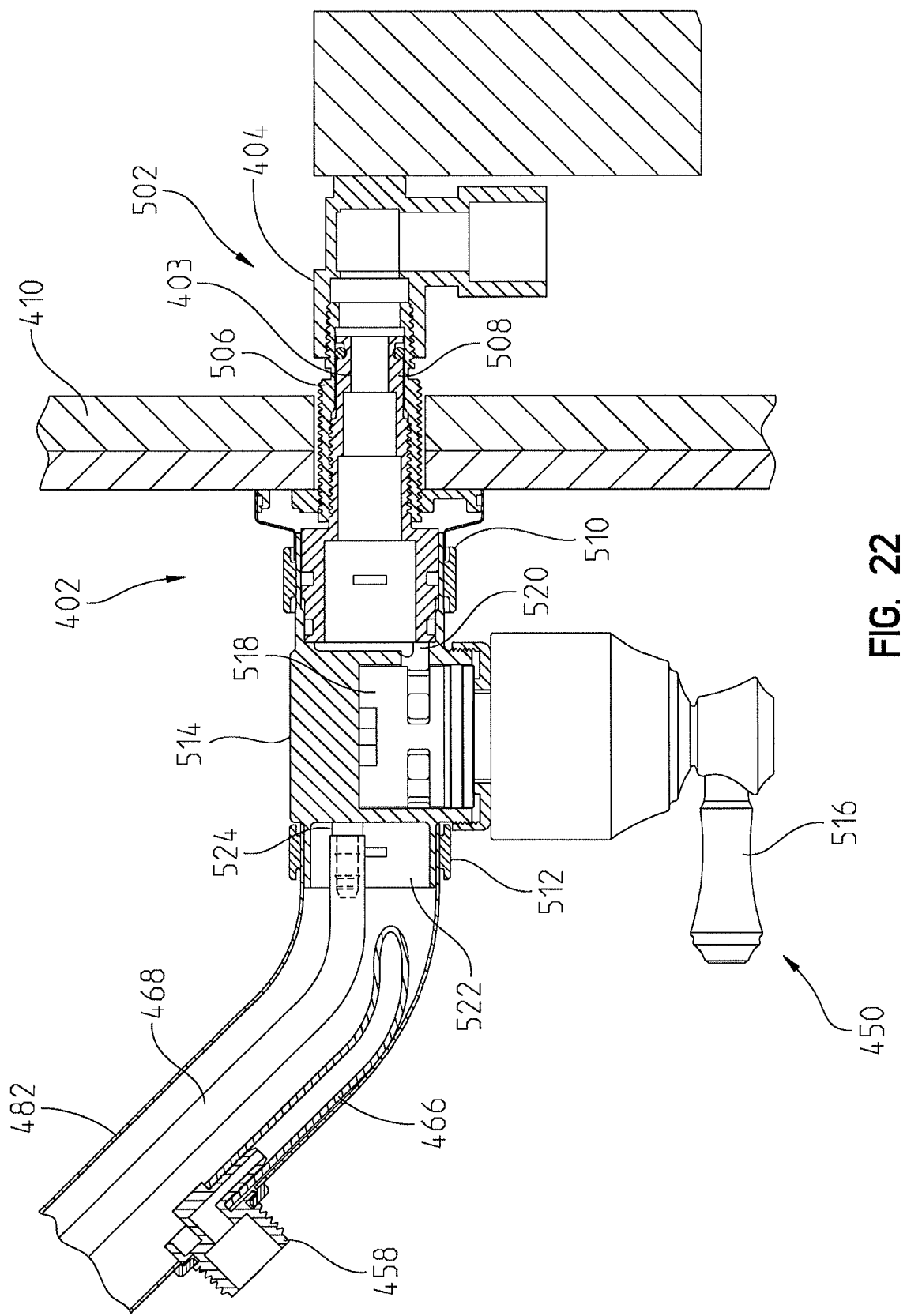
FIG. 22 is a partial cross-sectional view of the proximal mount of the showerhead system of FIG. 20.

As shown in FIG. 22, the proximal mount 402 includes an adjustable coupler 502 supported by the conventional shower pipe 404. The coupler 502 includes an outer tube 506 and an inner tube 508 threadably received with the outer tube 506. The coupler allows for varying thicknesses of the end wall 410. Retaining clips 510 and 512 secure the diverter valve body 514 intermediate the coupler 502 and the outer cover 482 of the support 414. The tube inside a tube allows for variation in the position of the dog cared elbow as well as the wall thickness without pushing the diverter valve 450 further away from the wall surface. A sliding escutcheon may be used to cover the mounting flange.

Figure 23:
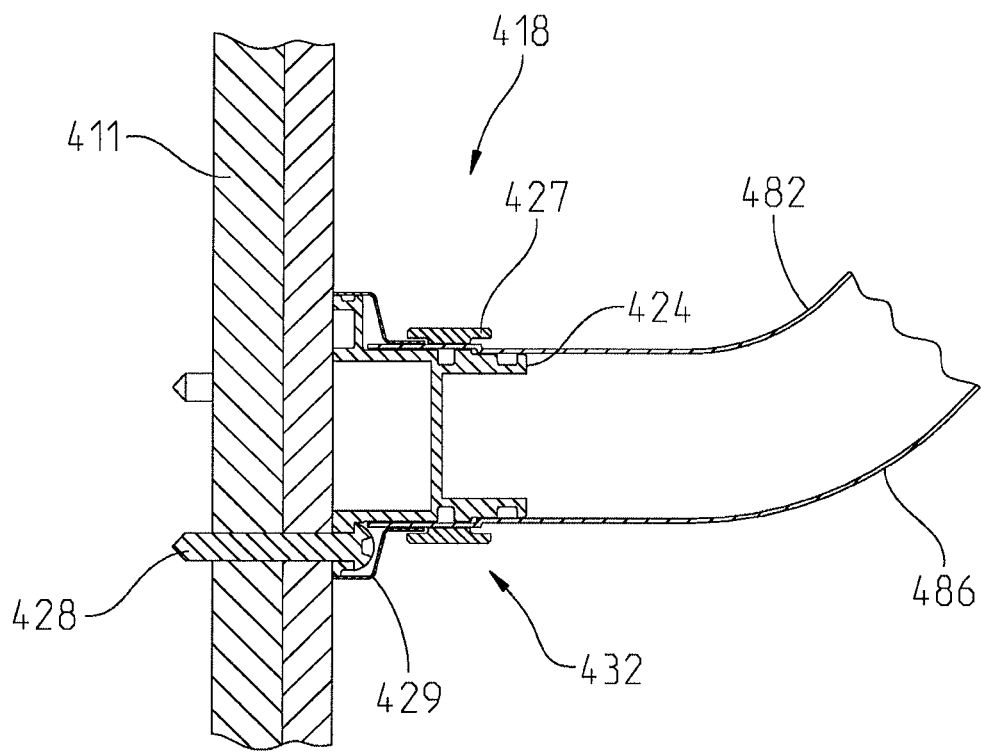
FIG. 23 is a partial cross-sectional view of the distal mount of the showerhead system of FIG. 20.

With reference to FIG. 23, the distal mount 432 illustratively includes a bracket 424 received within the distal end 418 of the outer sleeve 482 (also referred to herein as outer cover 482) and secured thereto via a retaining clip 427. Wall anchors 428 may be used to attach the bracket 424 to the end wall 411.

Figure 24:
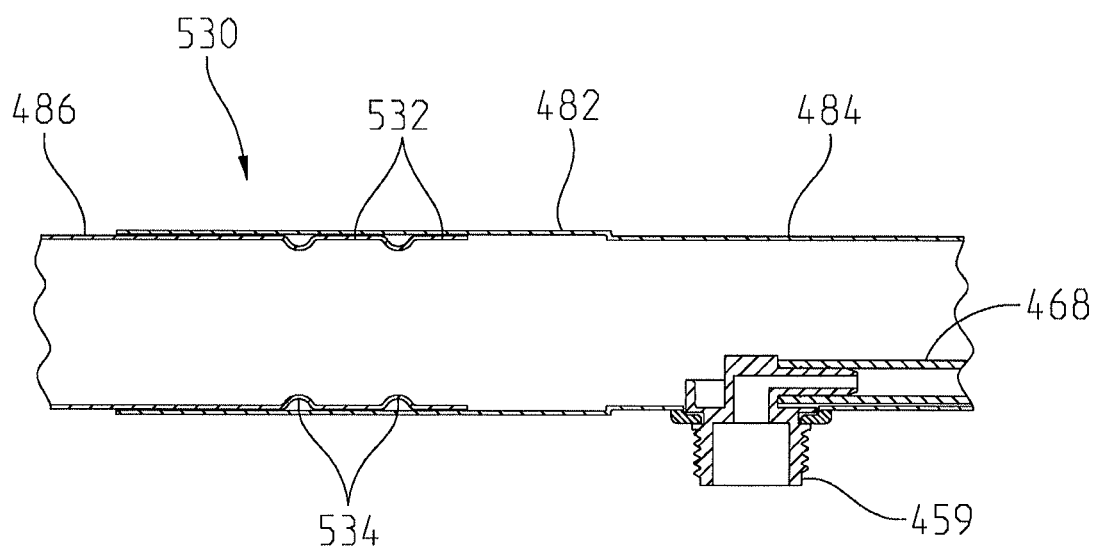
FIG. 24 is a cross-sectional view of the adjustable coupling of the showerhead system of FIG. 20.

A length adjustment device, such as a sliding joint 530, is illustratively coupled to the outer cover 482 to adjust for the actual width between the walls 410 and 411 (which varies depending on the material used to finish the shower enclosure and other factors). More particularly, the outer cover 482 includes a proximal outer cover member 484 and a distal outer cover member 486 coupled together by the sliding joint 530. As shown in FIG. 24, the proximal outer cover member 484 slidably receives the distal outer cover member 486, wherein lands 532 and grooves 534 cooperate to bias the members 484 and 486 toward each other.

The first half of the pipe assembly including the diverter valve 450 clips into the proximal mount 402, and the second half slides into the first half and then clips onto the second half to make the assembly extremely simple, only requiring some minimal assembly and drilling a few holes for the wall anchors. PEX tubes 466 and 468 are used inside the outer cover 482 to connect the diverter valve 450 to the showerheads 420, 422.

With reference now to FIGS. 25-37, a further illustrative showerhead system 600 includes an arched support 614 including an outer cover or rail member 615 extending between a proximal end 616 and a distal end 618. A proximal mount 602 couples the proximal end 616 of the rail member 615 to a conventional shower inlet pipe 604 mounted within a shower end wall. A distal mount 606 couples the distal end 618 of the rail member 615 to an opposing shower end wall.

The position of at least one showerhead 622 can be adjusted through a multi-link structure, and/or by posable gooseneck structure (e.g. microphone stand). It may also be achieved by flexible mounting on a linear or arcuate structure with multiple degrees of freedom available. FIGS. 26A-26D show different illustrative positions of the showerhead 622 as it is moved along the rail member 615 of the arched support 614. Illustrative positions of the showerhead 622 include a distal position (FIG. 26A), a center position (FIG. 26B), a distal center position (FIG. 26C) and a distal position (FIG. 26D).

Figure 29:
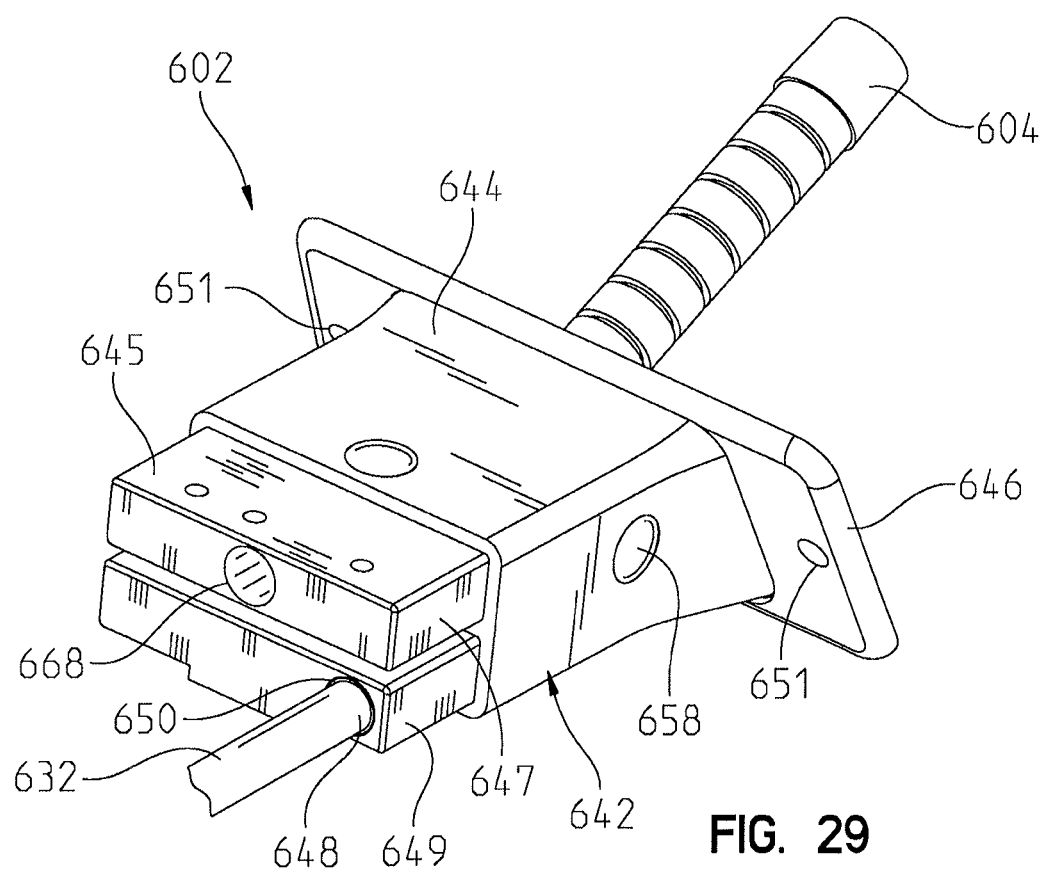
FIG. 29 is a perspective view of a proximal mount of the showerhead system of FIG. 25.
Figure 28:
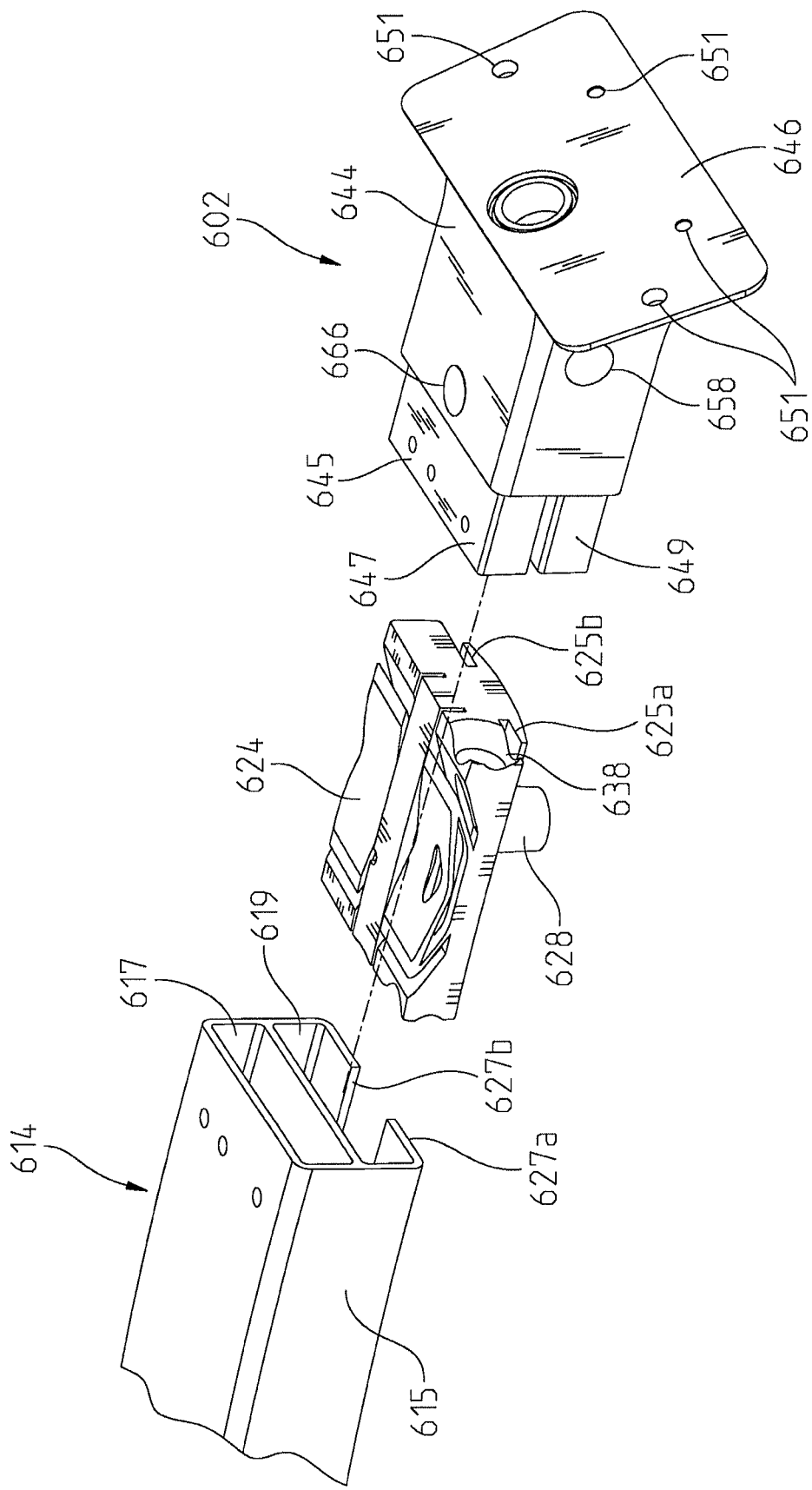
FIG. 28 is a partial exploded perspective view of the showerhead system of FIG. 25, showing the carriage supported for movement by the overhead support, and a distal mount of the overhead support.

With reference to FIGS. 28 and 29, the illustrative proximal mount 602 includes a manifold 642 having a mounting body 644 and a mounting flange 646. The mounting body 644 illustratively couples to the proximal end 616 of the rail member 615. More particularly, the mounting body 644 includes an extension 645 having upper and lower members 647 and 649. The upper and lower members 647 and 649 are received within pockets or channels 617 and 619 of the rail member 615. A mounting flange 646 includes apertures 651 configured to received fasteners (e.g., bolts) for securing the mounting body 644 to the shower end wall.

Figure 25:
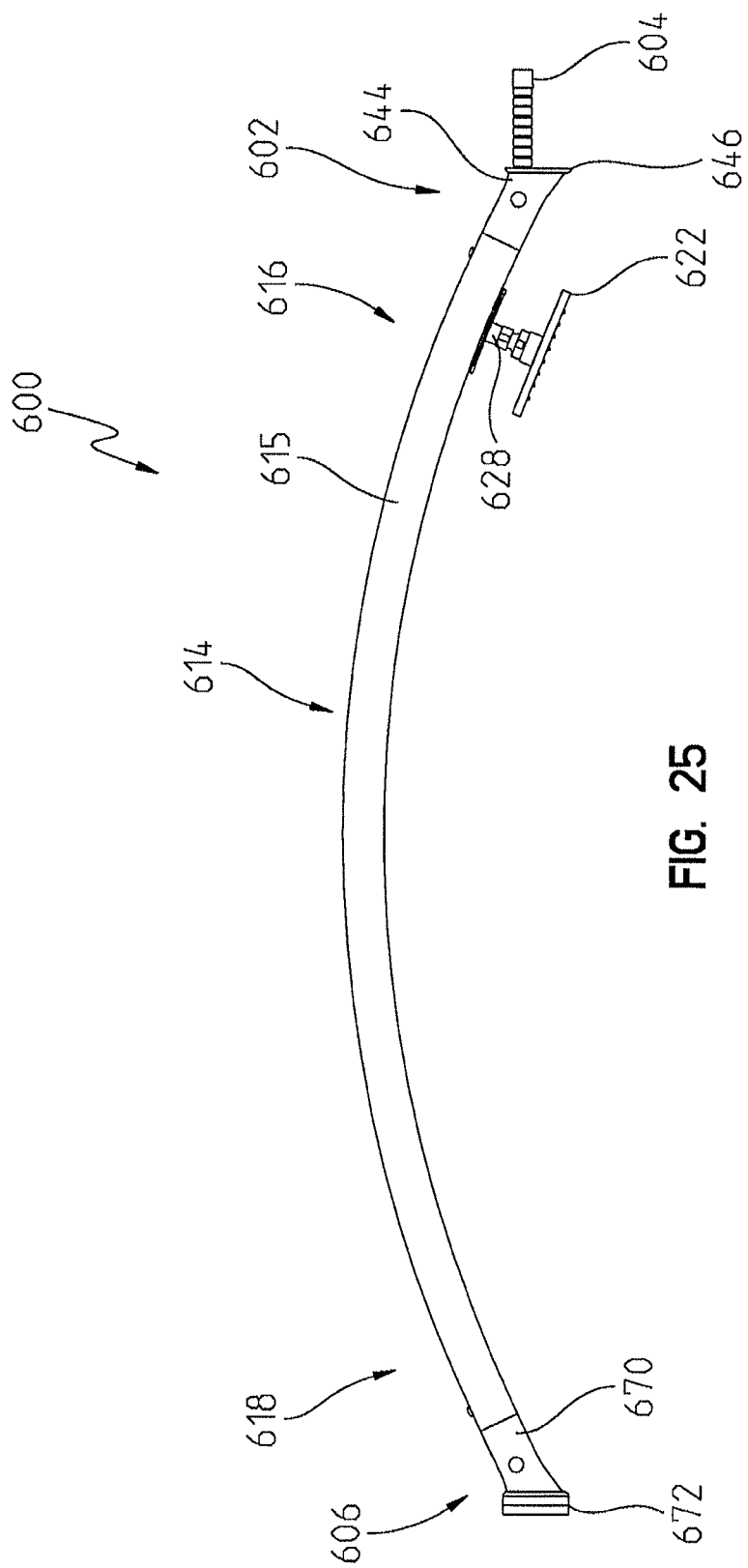
FIG. 25 is a side elevational view of a further illustrative showerhead system of the present disclosure, shown in a first configuration with a moveable showerhead.

With reference to FIG. 25, the distal mount 606 may be of similar design as the proximal mount 602. More particularly, the distal mount 606 illustratively includes a mounting body 670 and a mounting flange 672.

Figure 27:
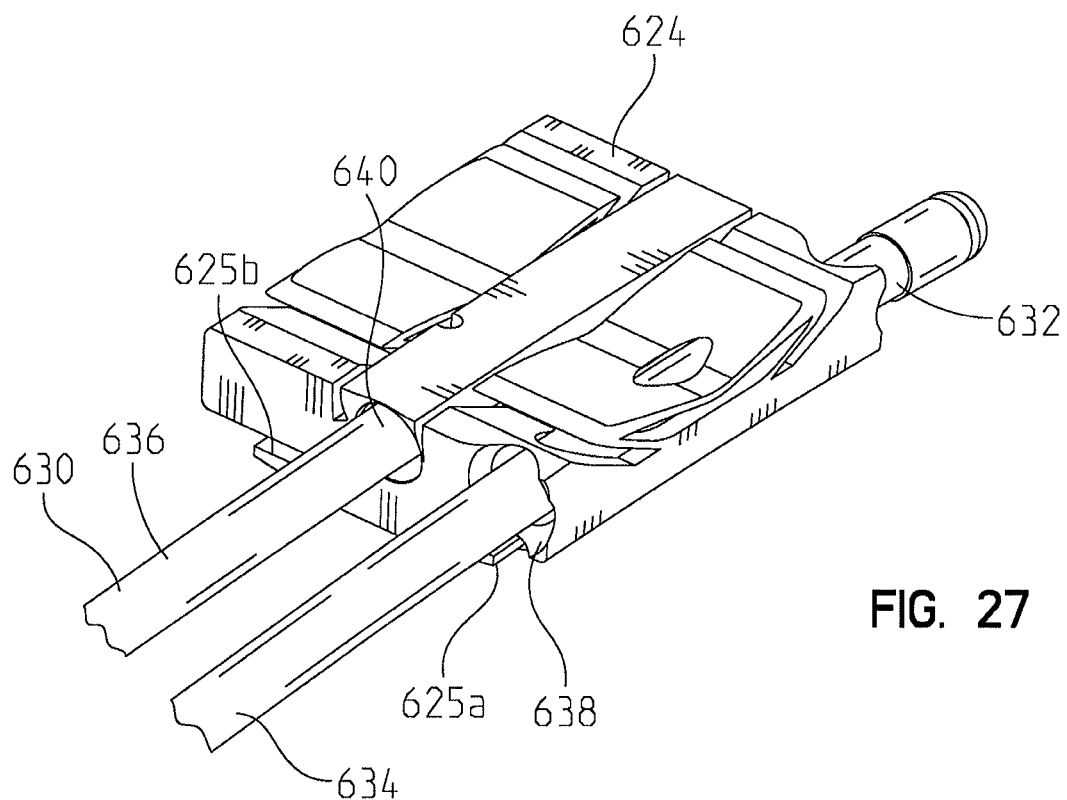
FIG. 27 is a perspective view of a carriage of the showerhead system of FIG. 25.

With reference to FIGS. 27 and 28, a carriage 624 is supported for sliding movement along the pocket 619 of the rail member 615. The carriage 624 includes opposing slots 625a and 625b configured to receive flanges 627a and 627b, respectively, of the rail member 615. A fluid coupler 628 is supported by the carriage 624 and fluidly couples to the showerhead 622. A flexible fluid conduit or tube 630 is fluidly coupled to the shower inlet pipe 404, and includes a first portion 632 fluidly coupled to the proximal mount 602 (and shower inlet pipe 604) and positioned on the proximal side of the carriage 624, a second portion 634 coupled to the first portion 632 and positioned on the distal side of the carriage 624, and a third portion 636 coupled to the second portion 634 and looping back to the carriage 624 at a coupler 640. The first portion 632 of the conduit 630 passes through an opening 638 of the carriage 624 to the second portion 634, such that carriage 624 may move there along.

FIG. 30 illustrates the mounting body 644 defining a manifold in a first configuration. More particularly, the mounting body 644 includes an inlet passageway 652, a first diverter passageway 658, a first outlet passageway 650, a second outlet passageway 662, a second diverter passageway 666, and a third outlet passageway 668. Illustratively, a first diverter valve 656 is configured to be received within the first diverter passageway 658 and is configured to control water flow (shown by arrows in FIG. 30) to the first outlet passageway 650 and the fluid conduit 632. Fluid conduit 632 illustratively includes a molded coupler 648 received within the first outlet passageway 650. In the first configuration of FIG. 30, a sealing plug 660 is received within the second outlet passageway 662, and a sealing plug 664 is received within the second diverter passageway 666. While the diverter valve 656 may seal the third outlet passageway 668, a scaling plug (not shown) may be received within the passageway 668 in addition, or as an alternative to the diverter valve 656.

Figure 31:
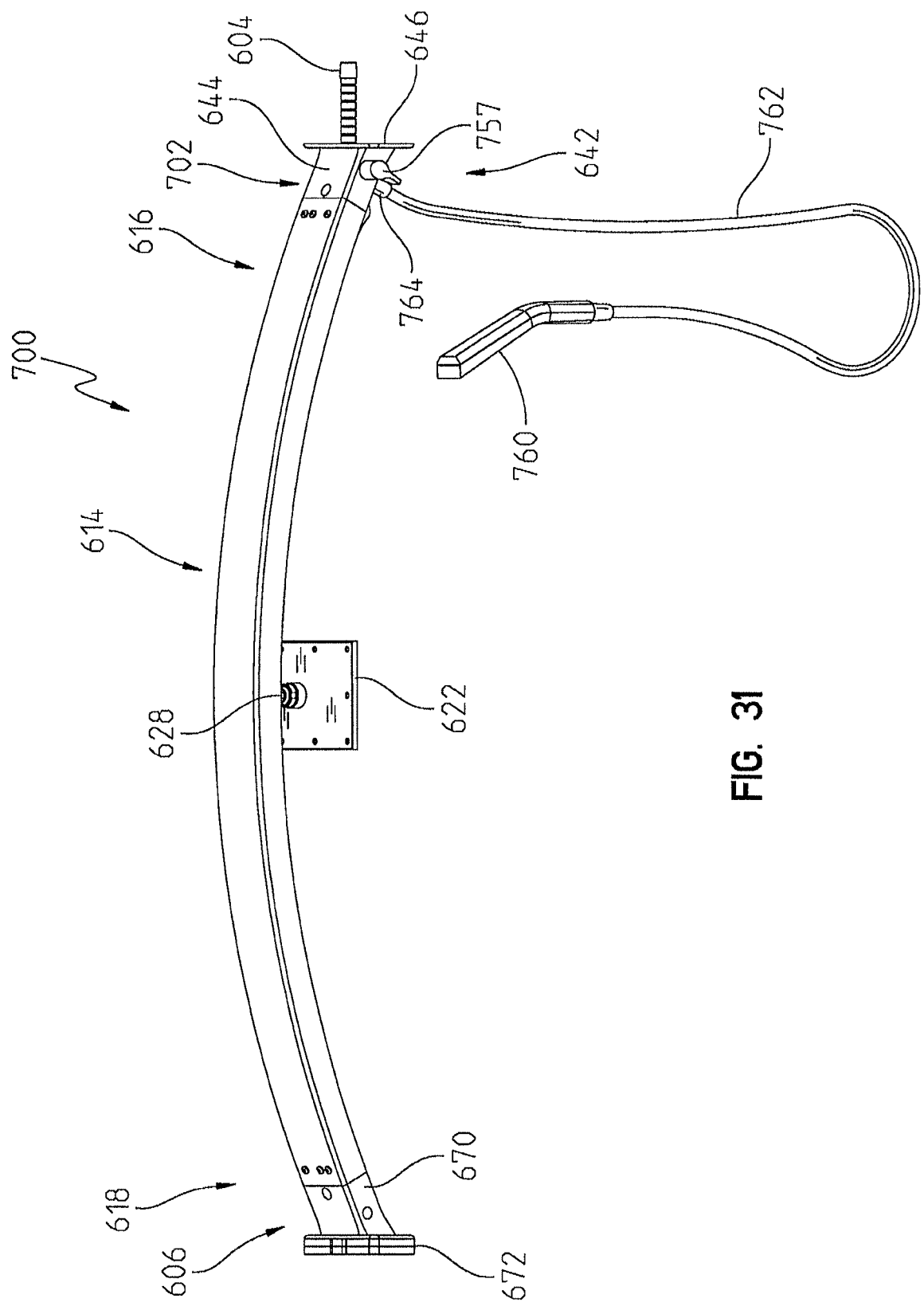
FIG. 31 is a perspective view of the showerhead system of FIG. 25 in a second configuration with a moveable showerhead and a handshower.
Figure 32:
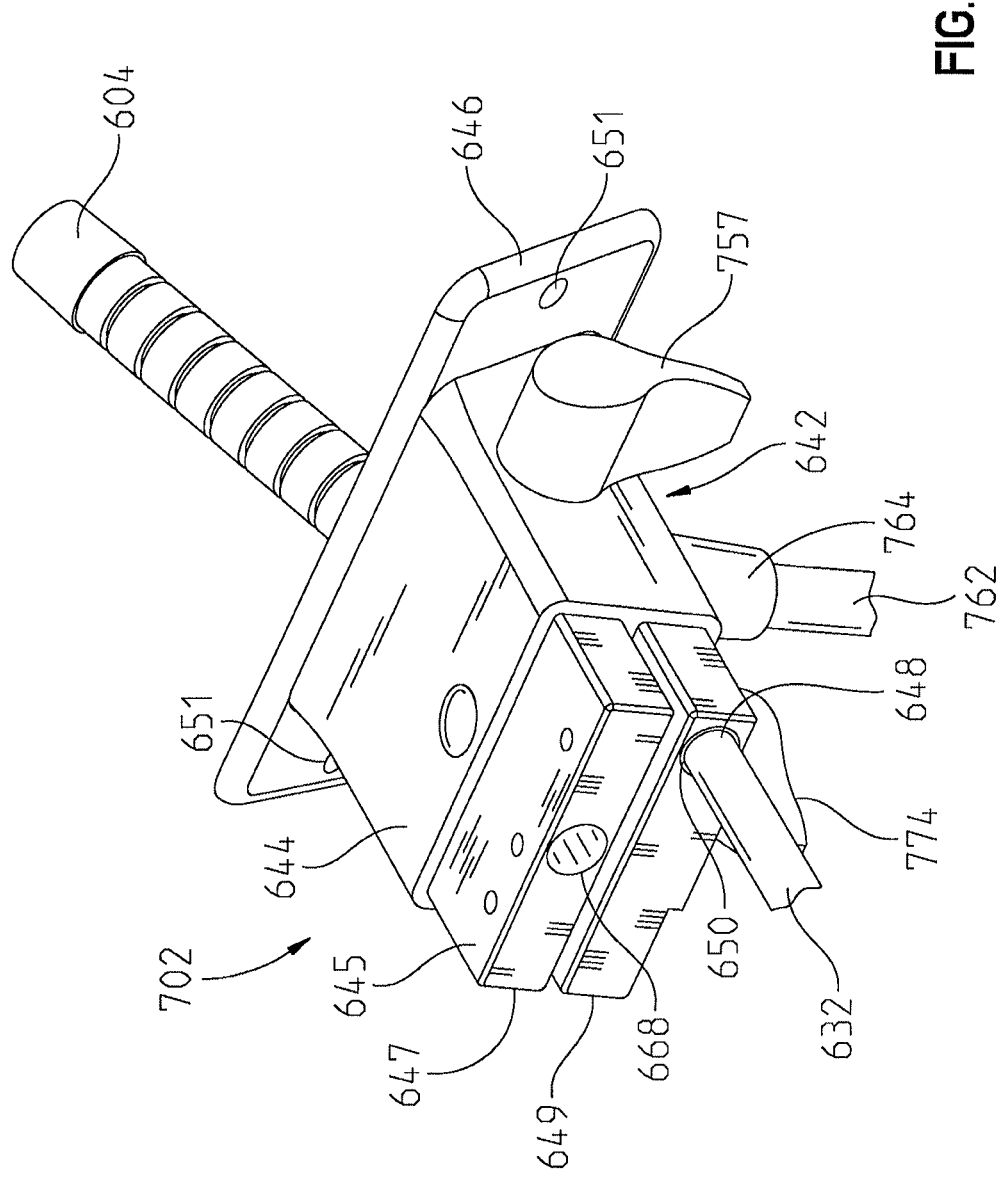
FIG. 32 is a perspective view of the proximal mount of the showerhead system of FIG. 31.
Figure 33:
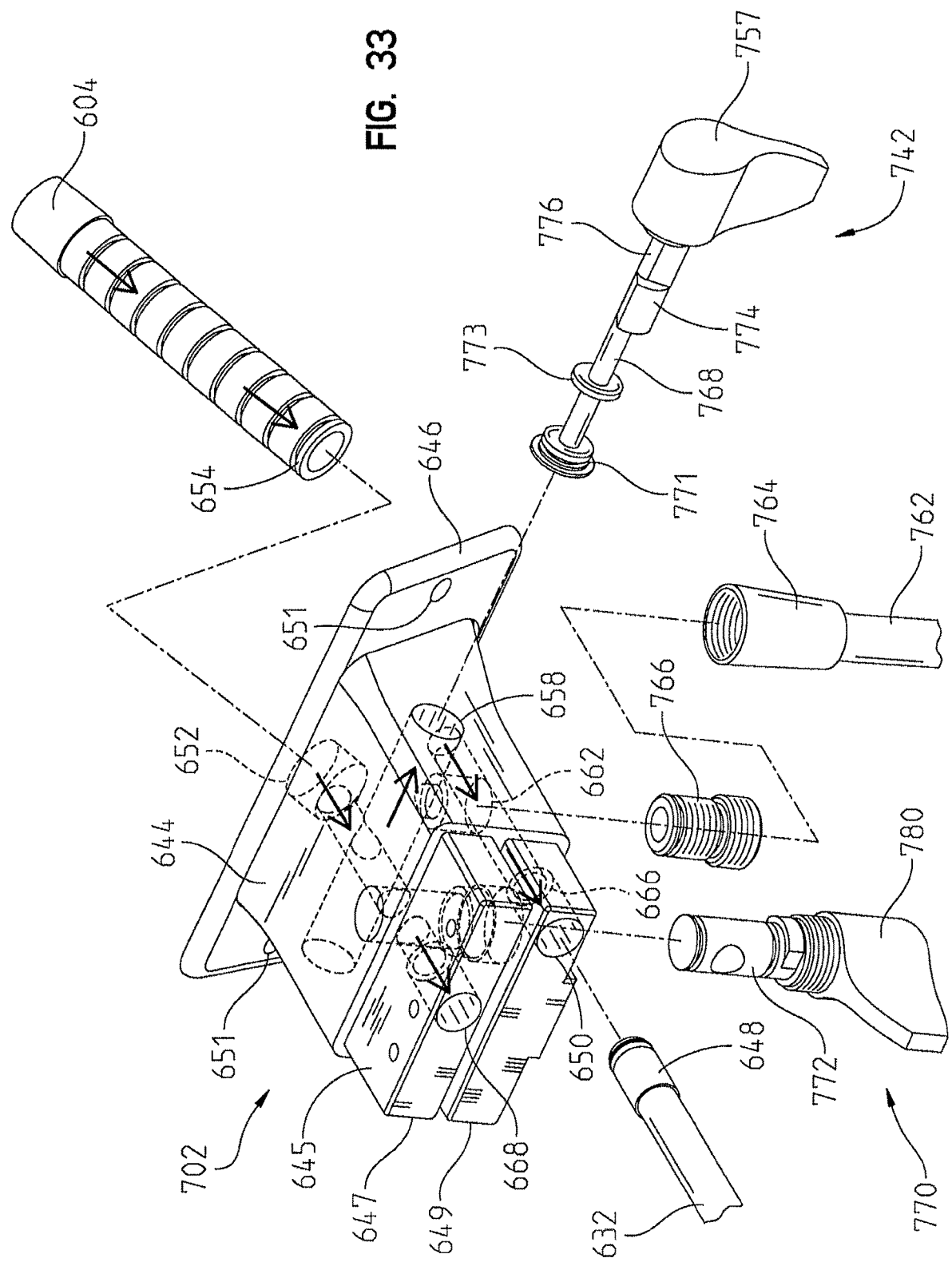
FIG. 33 is an exploded perspective view of the proximal mount of FIG. 32, showing the manifold in a second configuration.

FIGS. 31-33 show a showerhead system 700, similar to the showerhead system 600 of FIG. 25 in a second configuration with a showerhead 622 moveable along the rail member 615, and a handshower 760 coupled to the proximal support 702. Illustratively, a first diverter valve 742 may control water flow between the first outlet passageway 650 and the second outlet passageway 662 (and the handshower 760), and a second diverter valve 770 may control water flow to the third outlet passageway 668. The handshower 760 illustratively includes a hose 762 and a coupler 764 fluidly coupled to the second outlet passageway 662 via an adapter 766. Illustrative water flow is shown by arrows in FIG. 33, where water flows from an outlet 654 of the shower inlet pipe 604 through the inlet passageway 652, to the first diverter passageway 658 where the first diverter valve 742 directs water to the first outlet passageway 650 (and conduit 630) and the second outlet passageway 662 (and the handshower 760). Additional water flow may be directed by the second diverter valve 770 to the third outlet passageway 668.

The first diverter valve 742 is illustratively received within the first diverter passageway 658 and includes a rotatable stem 768 supporting seals 771 and 773, and diverter valve members 774 and 776. A handle 757 is supported at an outer end of the stem 768.

The second diverter valve 770 is illustratively received within the second diverter passageway 666 and includes a rotatable valve member 772 coupled to a handle 780.

Figure 36:
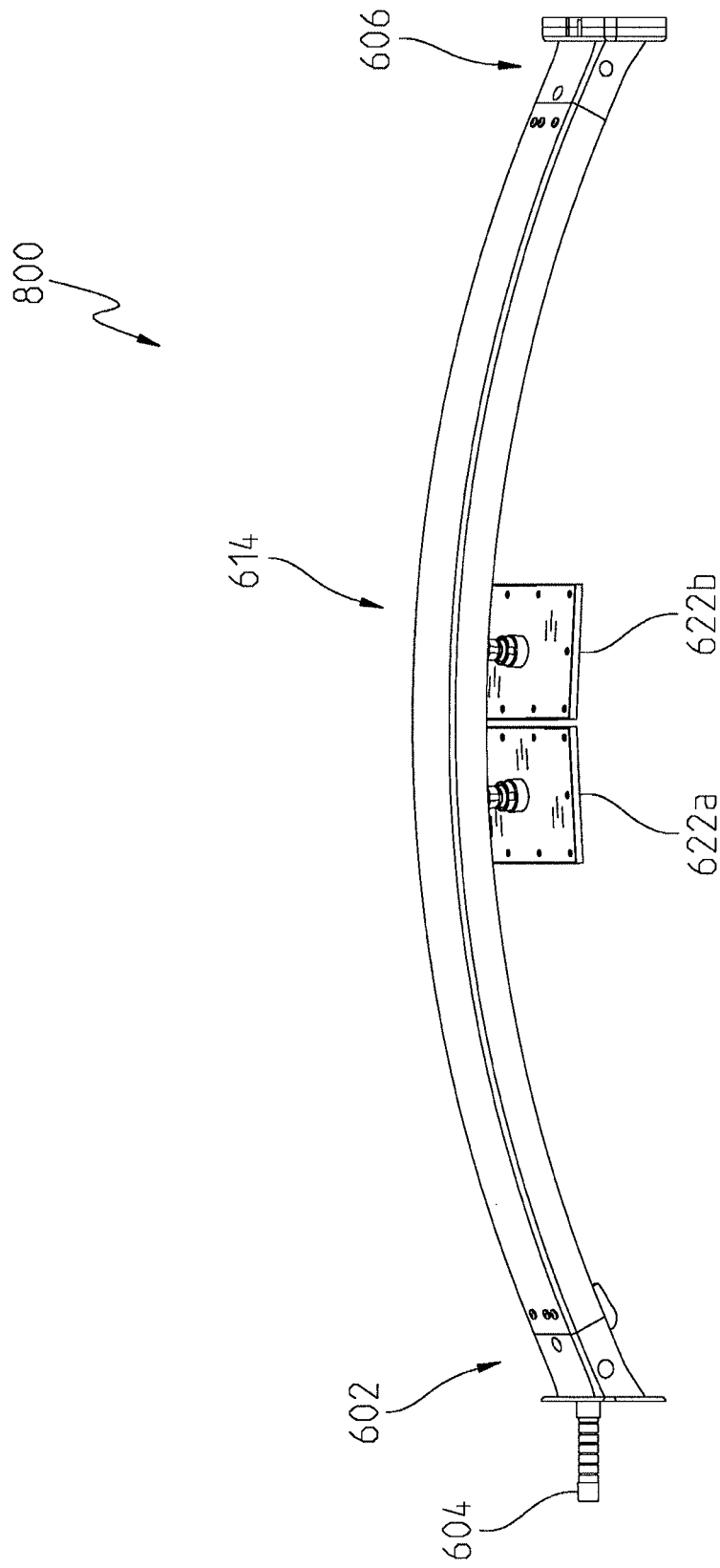
FIG. 36 is a perspective view similar to FIG. 35, showing the first moveable showerhead engaging with the second moveable showerhead.

FIGS. 34-36, illustrate a showerhead system 800 when two (or more) showerheads 622a and 622b are brought into proximity of one another (or as a single showerhead 622 is brought to a specific position on the rail member 615), a diverter valve will automatically actuate to change spray setting or adjust the flow rate. A first fluid conduit 630a provides fluid communication from the proximal mount 602 to the first showerhead 622a (coupled to the first carriage 624a), a connecting conduit 830 provides fluid communication between the proximal mount 602 and the distal mount 606, and a second fluid conduit 630b provides fluid communication from the distal mount 606 and the second showerhead 622b (coupled to the second carriage 624b). The diverter valve could be actuated by mechanical or magnetic connection to another showerhead 622a, 622b, by wireless or wired communication with any other electromechanical showerhead, or by its position relative to the device (e.g. support 614 such as shower arm or shower bar) it is mounted on. This could be achieved by switching flow to another set of outlets, or switching flow through another fixed rate flow control, or continuously varying the flow rate through other means (such as adjusting the orifice size of the inlet to the showerhead 622a, 622b).

Figure 37:
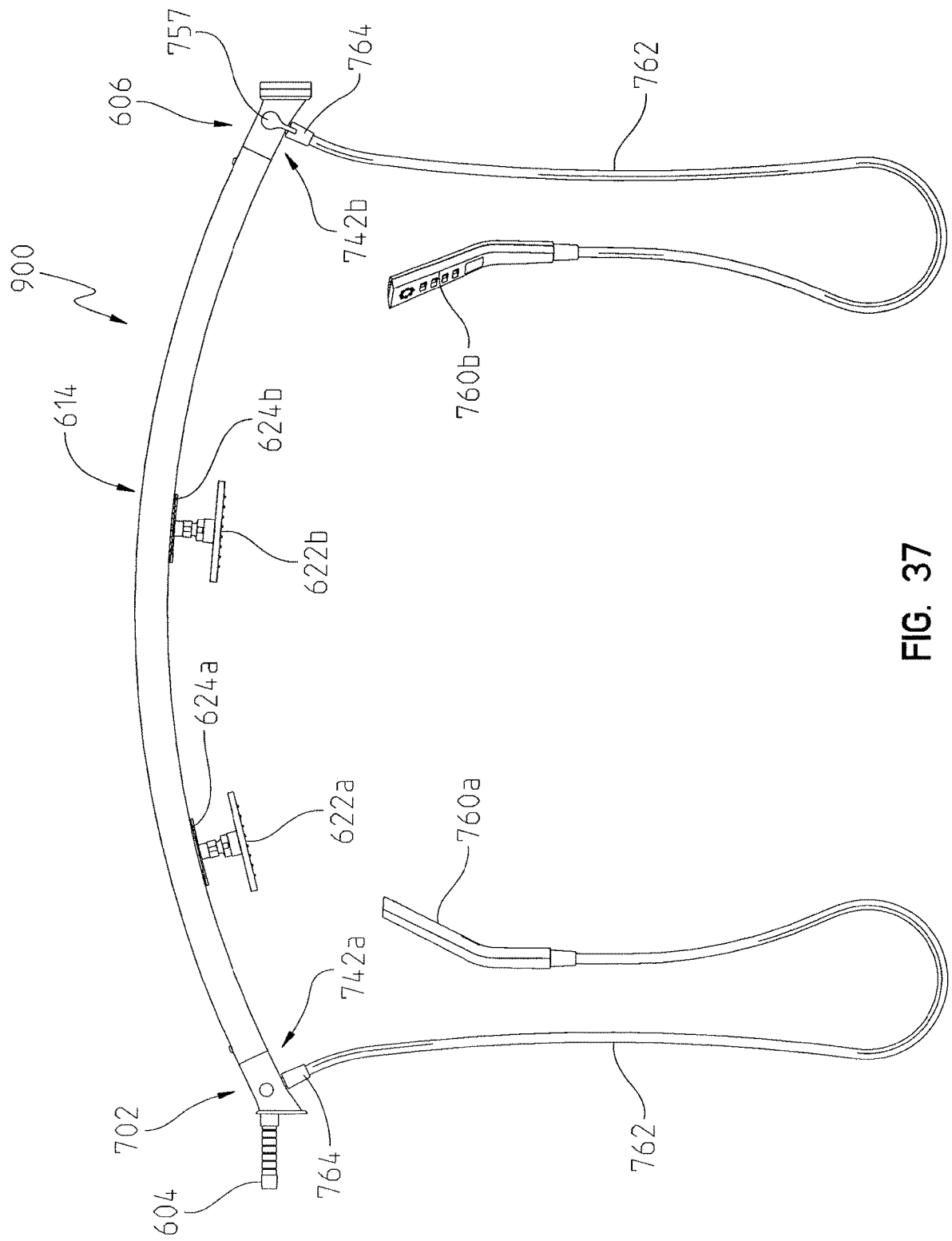
FIG. 37 is a side elevational view of the showerhead system of FIG. 25 in a fourth configuration, showing first and second moveable showerheads, and first and second handshowers.

FIG. 37 shows an illustrative embodiment showerhead system 900 with moveable showerheads 622a and 622b, and dual handshowers 760a and 760b. The diverter valves 742a and 742b may be of the design detailed above to control water flow between the respective showerheads 622a, 622b and handshowers 760a, 760b.

Although the invention has been described in detail with reference to certain preferred embodiments, variations and modifications exist within the spirit and scope of the invention as described and defined in the following claims.

The invention claimed is:
1. A showerhead system comprising;
a water inlet;
a vertical connecting support including a waterway fluidly coupled to the water inlet;
a horizontal connecting support including a waterway extending between a proximal end and a distal end, the waterway of the horizontal connecting support fluidly coupled to the waterway of the vertical connecting support;
a height adjustment device operably coupled to the vertical connecting support;
a first showerhead fluidly coupled to the water inlet;
a second showerhead positioned distally of the first showerhead, the second showerhead fluidly coupled to the waterway of the horizontal connecting support; and wherein the proximal end of the horizontal connecting support is coupled with the vertical connecting support whereby the height adjustment device adjusts the vertical height of both the vertical connecting support and the proximal end of the horizontal connecting support, and wherein the distal end of the horizontal connecting support is adapted to be supported by a wall.

2. The showerhead system of claim 1, further comprising a length adjustment device operably coupled to the horizontal connecting support, and configured to adjust the distance between the proximal end and the distal end.

3. A showerhead system comprising;
a water inlet;
a vertical connecting support including a waterway fluidly coupled to the water inlet;
a horizontal connecting support including a waterway extending between a proximal end and a distal end, the waterway of the horizontal connecting support fluidly coupled to the waterway of the vertical connecting support;
a height adjustment device operably coupled to the vertical connecting support;
a first showerhead fluidly coupled to the water inlet;
a second showerhead positioned distally of the first showerhead, the second showerhead fluidly coupled to the waterway of the horizontal connecting support; and
a proximal mount supporting the proximal end of the horizontal connecting support to a ceiling, and a distal mount supporting the distal end of the horizontal connecting support to the ceiling.

4. The showerhead system of claim 3, wherein each of the proximal mount and the distal mount includes an angled fluid connector, and a mounting bracket supporting the angled fluid connector.

5. The showerhead system of claim 4, wherein each of the proximal mount and the distal mount further includes a decorative cap receiving the fluid connector and the mounting bracket.

6. The showerhead system of claim 5, wherein the angled fluid connector includes an inlet tube and an outlet tube in fluid communication with the inlet tube, the inlet tube extending perpendicular to the outlet tube.

7. The showerhead system of claim 1, wherein the first showerhead includes an angled showerhead including a sprayface extending at an angle from vertical and from horizontal for discharging water downwardly, and the second showerhead includes an overhead pendant showerhead including a sprayface extending horizontally for discharging water downwardly.

8. A showerhead system comprising;
a water inlet;
a vertical connecting support including a waterway fluidly coupled to the water inlet;
a horizontal connecting support including a waterway extending between a proximal end and a distal end, the waterway of the horizontal connecting support fluidly coupled to the waterway of the vertical connecting support;
a height adjustment device operably coupled to the vertical connecting support;
a first showerhead fluidly coupled to the water inlet;
a second showerhead positioned distally of the first showerhead, the second showerhead fluidly coupled to the waterway of the horizontal connecting support; and
wherein the height adjustment device includes an outer tube of the vertical connecting support, an inner tube of the vertical connecting support telescopingly received within the outer tube, and at least one o-ring sealingly received intermediate the outer tube and the inner tube.

9. A showerhead system comprising;
a water inlet;
a vertical connecting support including a waterway fluidly coupled to the water inlet;
a horizontal connecting support including a waterway extending between a proximal end and a distal end, the waterway of the horizontal connecting support fluidly coupled to the waterway of the vertical connecting support;
a height adjustment device operably coupled to the vertical connecting support;
a first showerhead fluidly coupled to the water inlet;
a second showerhead positioned distally of the first showerhead, the second showerhead fluidly coupled to the waterway of the horizontal connecting support;
a carriage including a coupler fluidly coupled to the first showerhead; and
wherein the horizontal connecting support includes an arched portion extending upwardly toward a center portion intermediate the proximal end and the distal end, the arched portion including a rail member supporting the carriage for sliding movement such that the first showerhead is supported for movement along the arched portion.

10. A showerhead system comprising:
a water inlet;
a support extending between a proximal end and a distal end, the support including a center portion positioned above the proximal end and the distal end wherein the support includes an outer cover and an inner fluid conduit received within the outer cover;
a first showerhead supported by the support and fluidly coupled to the water inlet;
a second showerhead supported by the support distally of the first showerhead, the second showerhead fluidly coupled to the water inlet;
a diverter valve configured to control water flow from the water inlet to the first showerhead and the second showerhead; and
a length adjustment device operably coupled to the support and configured to adjust the distance between the proximal end and the distal end.

11. The showerhead system of claim 10, wherein the length adjustment device includes a sliding joint.

12. The showerhead system of claim 10, wherein the first showerhead includes an angled showerhead, and the second showerhead includes an overhead pendant showerhead.

13. The showerhead system of claim 10, wherein a proximal mount supporting the proximal end includes an adjustable coupler to accommodate varying mounting wall thicknesses.

14. A showerhead system comprising:
a water inlet;
a support extending between a proximal end and a distal end, the support including a center portion positioned above the proximal end and the distal end;
a first showerhead supported by the support and fluidly coupled to the water inlet;
a second showerhead supported by the support distally of the first showerhead, the second showerhead fluidly coupled to the water inlet;
a diverter valve configured to control water flow from the water inlet to the first showerhead and the second showerhead;

a length adjustment device operably coupled to the support and configured to adjust the distance between the proximal end and the distal end;

a carriage including a coupler fluidly coupled to the first showerhead; and wherein the support includes an arched portion extending upwardly toward the center portion intermediate the proximal end and the distal end, the arched portion including a rail member supporting the carriage for sliding movement such that the first showerhead is supported for movement along the arched portion.

15. The showerhead system of claim 14, wherein the support includes an outer cover and an inner fluid conduit received within the outer cover.

* * * * *